(12) United States Patent
Nagasundaram et al.

(10) Patent No.: US 10,586,054 B2
(45) Date of Patent: *Mar. 10, 2020

(54) PRIVACY FIREWALL

(71) Applicant: Visa International Service Association, San Francisco, CA (US)

(72) Inventors: Sekhar Nagasundaram, San Ramon, CA (US); Selim Aissi, Dublin, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,767

(22) Filed: Dec. 26, 2018

(65) Prior Publication Data

US 2019/0130115 A1 May 2, 2019

Related U.S. Application Data

(63) Continuation of application No. 15/491,455, filed on Apr. 19, 2017, now Pat. No. 10,204,227, which is a
(Continued)

(51) Int. Cl.
*G06F 21/60* (2013.01)
*G06F 16/28* (2019.01)
(Continued)

(52) U.S. Cl.
CPC ............ *G06F 21/60* (2013.01); *G06F 16/285* (2019.01); *G06F 21/606* (2013.01);
(Continued)

(58) Field of Classification Search
CPC ..... G06F 21/60; G06F 21/606; G06F 21/6254
(Continued)

(56) References Cited

U.S. PATENT DOCUMENTS

| 5,613,012 A | 3/1997 | Hoffman |
| 5,781,438 A | 7/1998 | Lee |

(Continued)

FOREIGN PATENT DOCUMENTS

| EP | 2156397 A1 | 2/2010 |
| WO | 2001035304 A1 | 5/2001 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Teshome Hailu
(74) *Attorney, Agent, or Firm* — Kilpatrick Townsend & Stockton LLP

(57) ABSTRACT

Embodiments of the invention relate to systems and methods for providing an anonymization engine. One embodiment of the present invention relates to a method comprising receiving a message directed at a recipient computer located outside a secure area by a privacy computer located within a secure area. The privacy computer may identify private information using a plurality of privacy rules and anonymize the message according to the plurality of privacy rules. Another embodiment may be directed to a method comprising receiving a request for sensitive data from a requesting computer. An anonymization computer may determine a sensitive data record associated with the request and may anonymize the sensitive data record by performing at least two of: removing unnecessary sensitive data entries from the sensitive data record, masking the sensitive data entries to maintain format, separating the sensitive data entries into associated data groupings, and de-contexting the data.

12 Claims, 8 Drawing Sheets

Related U.S. Application Data continuation of application No. 13/964,896, filed on Aug. 12, 2013, now Pat. No. 9,665,722.

(60) Provisional application No. 61/682,000, filed on Aug. 10, 2012.

(51) Int. Cl.
*G06F 21/62* (2013.01)
*H04L 29/06* (2006.01)

(52) U.S. Cl.
CPC ........ *G06F 21/6254* (2013.01); *H04L 63/107* (2013.01); *H04L 63/0209* (2013.01)

(58) Field of Classification Search
USPC ........................................................ 713/150
See application file for complete search history.

(56) References Cited

U.S. PATENT DOCUMENTS

| | | | |
|---|---|---|---|
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |
| 6,163,771 A | 12/2000 | Walker | |
| 6,227,447 B1 | 5/2001 | Campisano | |
| 6,236,981 B1 | 5/2001 | Hill | |
| 6,253,203 B1* | 6/2001 | O'Flaherty | G06F 21/6245 |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem-Ur | |
| 6,592,044 B1 | 7/2003 | Wong | |
| 6,636,833 B1 | 10/2003 | Flitcroft | |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 7,051,929 B2 | 5/2006 | Li | |
| 7,069,249 B2 | 6/2006 | Stolfo | |
| 7,103,576 B2 | 9/2006 | Mann, III | |
| 7,113,930 B2 | 9/2006 | Eccles | |
| 7,133,525 B1* | 11/2006 | DeGregorio | H04N 1/4406 |
| | | | 380/244 |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,209,561 B1 | 4/2007 | Shankar et al. | |
| 7,264,154 B2 | 9/2007 | Harris | |
| 7,287,692 B1 | 10/2007 | Patel | |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,444,676 B1 | 10/2008 | Asghari-Kamrani | |
| 7,469,151 B2 | 12/2008 | Khan | |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,627,531 B2 | 12/2009 | Breck | |
| 7,627,895 B2 | 12/2009 | Gifford | |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II | |
| 7,784,685 B1 | 8/2010 | Hopkins, III | |
| 7,793,851 B2 | 9/2010 | Mullen | |
| 7,797,725 B2* | 9/2010 | Lunt | G06F 21/6254 |
| | | | 707/602 |
| 7,801,826 B2 | 9/2010 | Labrou | |
| 7,805,376 B2 | 9/2010 | Smith | |
| 7,805,378 B2 | 9/2010 | Berardi | |
| 7,818,264 B2 | 10/2010 | Hammad | |
| 7,828,220 B2 | 11/2010 | Mullen | |
| 7,835,960 B2 | 11/2010 | Breck | |
| 7,841,523 B2 | 11/2010 | Oder, II | |
| 7,841,539 B2 | 11/2010 | Hewton | |
| 7,844,550 B2 | 11/2010 | Walker | |
| 7,848,980 B2 | 12/2010 | Carlson | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,890,393 B2 | 2/2011 | Talbert | |
| 7,891,563 B2 | 2/2011 | Oder, II | |
| 7,896,238 B2 | 3/2011 | Fein | |
| 7,908,216 B1 | 3/2011 | Davis et al. | |
| 7,922,082 B2 | 4/2011 | Muscato | |
| 7,931,195 B2 | 4/2011 | Mullen | |
| 7,937,324 B2 | 5/2011 | Patterson | |
| 7,938,318 B2 | 5/2011 | Fein | |
| 7,954,705 B2 | 6/2011 | Mullen | |
| 7,959,076 B1 | 6/2011 | Hopkins, III | |
| 7,996,288 B1 | 8/2011 | Stolfo | |
| 8,025,223 B2 | 9/2011 | Saunders | |
| 8,046,256 B2 | 10/2011 | Chien | |
| 8,060,448 B2 | 11/2011 | Jones | |
| 8,060,449 B1 | 11/2011 | Zhu | |
| 8,074,877 B2 | 12/2011 | Mullen | |
| 8,074,879 B2 | 12/2011 | Harris | |
| 8,082,210 B2 | 12/2011 | Hansen | |
| 8,095,113 B2 | 1/2012 | Kean | |
| 8,104,679 B2 | 1/2012 | Brown | |
| RE43,157 E | 2/2012 | Bishop | |
| 8,109,436 B1 | 2/2012 | Hopkins, III | |
| 8,121,942 B2 | 2/2012 | Carlson | |
| 8,121,956 B2 | 2/2012 | Carlson | |
| 8,126,449 B2 | 2/2012 | Beenau | |
| 8,132,723 B2 | 3/2012 | Hogg et al. | |
| 8,171,525 B1 | 5/2012 | Pelly | |
| 8,175,973 B2 | 5/2012 | Davis et al. | |
| 8,190,523 B2 | 5/2012 | Patterson | |
| 8,196,813 B2 | 6/2012 | Vadhri | |
| 8,205,791 B2 | 6/2012 | Randazza | |
| 8,219,489 B2 | 7/2012 | Patterson | |
| 8,224,702 B2 | 7/2012 | Mengerink | |
| 8,224,979 B2* | 7/2012 | Herz | G06F 21/6254 |
| | | | 709/206 |
| 8,225,385 B2 | 7/2012 | Chow | |
| 8,229,852 B2 | 7/2012 | Carlson | |
| 8,265,993 B2 | 9/2012 | Chien | |
| 8,280,777 B2 | 10/2012 | Mengerink | |
| 8,281,991 B2 | 10/2012 | Wentker et al. | |
| 8,328,095 B2 | 12/2012 | Oder, II | |
| 8,336,088 B2 | 12/2012 | Raj et al. | |
| 8,346,666 B2 | 1/2013 | Lindelsee et al. | |
| 8,376,225 B1 | 2/2013 | Hopkins, III | |

(56) References Cited

U.S. PATENT DOCUMENTS

| | | |
|---|---|---|
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,544,104 B2 * | 9/2013 | Burke ................ G06F 21/6245 726/26 |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0011247 A1 * | 8/2001 | O'Flaherty ............ G06Q 20/10 705/39 |
| 2001/0020785 A1 * | 9/2001 | Van Boom ................ B41J 3/51 283/72 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |

(56) References Cited

U.S. PATENT DOCUMENTS

| | | |
|---|---|---|
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0162402 A1 | 6/2010 | Rachlin |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0259877 A1* | 10/2012 | Raghunathan ...... G06F 21/6254 707/757 |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |

(56) References Cited

U.S. PATENT DOCUMENTS

| | | |
|---|---|---|
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0262863 A1* | 10/2013 | Yoshino ............... H04L 9/008 713/165 |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

(56) References Cited

OTHER PUBLICATIONS

McGuire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al., U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

Wong et al., U.S. Appl. No. 61/879,362 (unpublished), Systems and Methods for Managing Mobile Cardholder Verification Methods filed Sep. 18, 2013.

Powell, U.S. Appl. No. 61/892,407 (unpublished), Issuer Over-The-Air Update Method and System filed Oct. 17, 2013.

Powell, U.S. Appl. No. 61/926,236 (unpublished), Methods and Systems for Provisioning Mobile Devices With Payment Credentials and Payment Token Identifiers filed Jan. 10, 2014.

Chipman, et al., U.S. Appl. No. 15/265,282 (Unpublished), Self-Cleaning Token Vault, filed Sep. 14, 2016.

Lopez, et al., U.S. Appl. No. 15/462,658 (Unpublished), Replacing Token on a Multi-Token User Device, filed Mar. 17, 2017.

\* cited by examiner

PRIVACY FIREWALL

CROSS-REFERENCES TO RELATED CASES

This application is a continuation application of U.S. patent application Ser. No. 15/491,455, filed on Apr. 19, 2017, which is a continuation of U.S. patent application Ser. No. 13/964,896 entitled "Privacy Firewall", filed Aug. 12, 2013, which claims priority to U.S. Provisional Application No. 61/682,000, filed on Aug. 10, 2012, the entire contents of which are herein incorporated by reference for all purposes.

BACKGROUND

Typically, sensitive data records, databases, messages, communications, or any other information are encrypted to protect sensitive and/or private information that is stored in a secure area or is being transferred to an unsecure area. However, wholesale encryption of databases of information and messages raises a number of problems. First, encryption of all data (whether sensitive or not) is expensive and impacts the performance, speed, and efficiency of system. Additionally, encryption can make data useless or prohibitively costly in terms of performance for searching, analysis, aggregation, or any other purposes because the data must be decrypted and most likely re-encrypted in order to analyze the information or otherwise use the data. Finally, encryption and other cryptographic processes require the use and management of encryption keys, which can be costly, inefficient, and complex. Accordingly, there is a need for providing smarter, more efficient, and more economical data protection scheme.

Further, there is a need for a data security scheme that captures transactions, communications, etc. that may otherwise be exported outside of a secure area. For example, data breaches may be generated by trusted users whose accounts are hacked, corrupted, or otherwise controlled by malicious third parties. Accordingly, there is a need to protect private or confidential information from within an organization based on the recipient of the information outside the organization as well as implement organizational control of sensitive or private information. Accordingly, there is a need to provide a system that may be capable of analyzing, anonymizing, and removing any information that is sensitive, private, confidential, or otherwise valuable to an organization when the recipient does not appear to have a legitimate purpose for such data or any other time data is leaving an organization.

Embodiments of the present invention solve these problems and other problems, individually and collectively.

BRIEF SUMMARY

Embodiments of the invention are directed to system and methods for implementing an anonymization engine that may be used to provide data protection, access control, and privacy control for sensitive information.

Previous techniques for securing databases or communication messages include encryption of all the data within the database or message, which impacts a system's performance, speed, and efficiency. Additionally, such wholesale encryption makes the data unsearchable or requires a large amount of system resources to search. Accordingly, there is a need for solving how to protect the confidentiality of private and secure information (e.g., personal identifying information ("PII") and/or personal account information ("PAI")) while preserving the underlying functionality (searching, analysis, aggregation, use, etc.) of the data.

Embodiments of the present invention solve these problems by anonymizing sensitive or private information in order to transform information from an identity-rich state to an identity-free state, while still maintaining the functionality of the information for management, analysis, customer service, and/or any other useful purposes. Furthermore, embodiments of the present invention allow protection from unlawful use of consumer information or other private information, provide prevention from identification of people (i.e., "anonymizes" any sensitive data such that an individual cannot be readily identified by the data), and can render data useless from a privacy and security standpoint, while still allowing efficient access and use for specific purposes.

One embodiment of the present invention relates to a method. The method comprises receiving a message directed at a recipient computer located outside a secure area by a privacy computer located within a secure area. The message may include private information. The privacy computer may identify the private information using a plurality of privacy rules and anonymize the message according to the plurality of privacy rules. The privacy computer may forward the message including anonymized information to the recipient computer located outside the secure area.

Another embodiment of the present invention is directed to a privacy computer comprising a processor and a computer-readable medium coupled to the processor. The computer-readable medium comprises code executable by the processor for performing a method. The method comprises receiving a message directed at a recipient computer located outside a secure area by a privacy computer located within a secure area. The message may include private information. The privacy computer may identify the private information using a plurality of privacy rules and anonymize the message according to the plurality of privacy rules. The privacy computer may forward the message including anonymized information to the recipient computer located outside the secure area.

Another embodiment of the present invention is directed to a system comprising a privacy computer and a recipient computer, operationally coupled via a communications network.

Another embodiment of the present invention is directed to a method comprising receiving a request for sensitive data from a requesting computer by an anonymization computer. The anonymization computer may determine a sensitive data record comprising sensitive data associated with the request and determine anonymization rules associated with the requesting computer. The anonymization computer may anonymize the sensitive data record using the anonymization rules to generate an anonymized data record by performing at least two of: removing unnecessary sensitive data from the sensitive data record, masking the sensitive data to maintain format, separating the sensitive data into associated data groupings, and de-contexting the sensitive data. The anonymization computer may then send the anonymized data record to the requesting computer.

Another embodiment of the present invention is directed to an anonymization computer comprising a processor and a computer-readable medium coupled to the processor. The computer-readable medium comprises code executable by the processor for performing a method. The method comprises receiving a request for sensitive data from a requesting computer by an anonymization computer. The anonymization computer may determine a sensitive data record comprising sensitive data associated with the request and determine anonymization rules associated with the requesting computer. The anonymization computer may anonymize the sensitive data record using the anonymization rules to generate an anonymized data record by performing at least two of: removing unnecessary sensitive data from the sensitive data record, masking the sensitive data to maintain format, separating the sensitive data into associated data groupings, and de-contexting the sensitive data. The anonymization computer may then send the anonymized data record to the requesting computer.

Another embodiment of the present invention is directed to a system comprising an anonymization computer and a requesting computer, operationally coupled via a communications network.

These and other embodiments of the invention are described in detail below.

DETAILED DESCRIPTION

Figure 1:
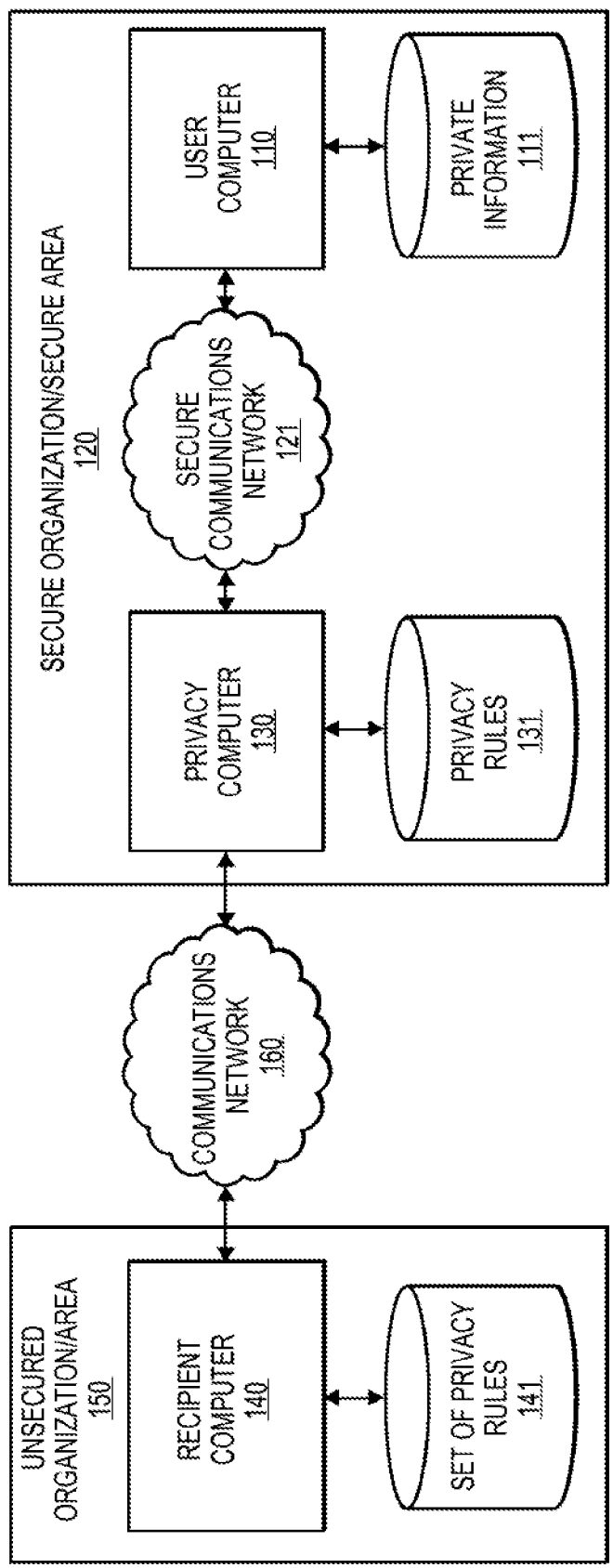
FIG. 1 shows an exemplary block diagram illustrating an exemplary privacy firewall system, according to one embodiment of the present invention.

Embodiments of the invention are directed to systems and methods for implementing an anonymization engine that provides data protection, access control, and privacy control for databases of information and communications. The anonymization engine may be used for a number of purposes including protecting private information from export outside of a secure environment as well as for providing easily customizable anonymized data for a specific purpose of a requester.

Accordingly, embodiments of the present invention provide a customizable anonymization engine that may provide anonymization for many different entities based on their needs, access rights, trust level, etc., according to a plurality of privacy and anonymization rules that are configured or associated with a particular user, organization, or computer. Accordingly, an anonymization engine may be provided that may be capable of performing various anonymization processes to provide a configurable level of anonymization that is tied to the privacy or security level of the sensitive data.

According to embodiments of the present invention, sensitive data records and/or private information may be anonymized by applying any combination of two or more anonymization processes including: (i) removing unnecessary data, (ii) masking and/or scrubbing data, (iii) separating data into associated data groupings, and (iv) de-contexting sensitive data such that the information is no longer sensitive because there is no context to put the sensitive information into. Further, the anonymization engine may analyze the sensitive data for relevant search strings and flag those search strings to ensure they are not anonymized, tokenized, and/or encrypted by the anonymization engine. Accordingly, the anonymized data may be searchable and customizable for a number of purposes depending on the requestor.

One embodiment of the present invention is directed at a privacy firewall. The privacy firewall may intercept any data that is being transferred outside of a secure area and may apply anonymization techniques to anonymize any private information before it is transferred. Accordingly, if a secure organization is compromised or otherwise hacked by malicious third parties, the value of the information leaving the secure area may be limited if private or sensitive information contained therein is anonymized. Further, if a distraught or careless employee attempts to send confidential, private, or secure information outside of the secure area or organization, the privacy firewall may limit the value or otherwise protect the private information by anonymizing the private information.

Another embodiment of the present invention may provide anonymization of sensitive databases as a service. Accordingly, an anonymization computer may anonymize large amounts of data using anonymization rules tailored to a particular purpose of a requestor. Anonymization rules may be used to identify which data should be removed, masked, scrubbed, separated, and/or de-contexted in order to provide a meaningful and useful anonymized dataset for the requestor's particular purpose.

Accordingly, an anonymization engine implementing a customizable rule-based anonymization of large amounts of data may be provided based on each particular customer's need and capabilities. Accordingly, a customer may provide anonymization rules to an anonymization engine and may be provided with their customized anonymized data. Depending on the needs of the customer, the anonymization rules may be generated so that the customer can customize the de-contexting, the separation of data, etc., to match their needs.

For example, if a customer service representative is helping a customer by inspecting a prior purchase on their account for a return, the customer service representative may have no need for a large amount of data on the consumer's database record. For instance, the consumer's social security number, personal account number, financial information, home address, or any other sensitive personal information may be unnecessary for the task at hand. As such, it is an unnecessary risk to show such sensitive information to a customer service agent which may steal the consumer's identity or otherwise use the consumer's information for illicit purposes. However, the customer service representative may still need some information to verify the consumer, determine if the transaction occurred, or any other reason related completing the return of the product. Accordingly, embodiments of the present system may remove, separate, de-context, and anonymize sensitive data records while leaving enough information to maintain the usefulness of the data.

Embodiments of the invention provide a number of technical advantages. For example, embodiments of the present invention provide more efficient use of system resources because the system can search, compare, and use anonymized databases without having to decrypt huge databases of information.

Furthermore, to increase security and performance, the anonymization engine may be configured to implement the level of anonymization that is necessary for the purpose of the requestor. Therefore, the data may still contain valuable information but may also be secure because it is anonymized for a specific purpose, without having to encrypt the entire data set. Accordingly, system resources are saved by specifically anonymizing data as necessary instead of implementing whole-sale encryption across an entire database.

For example, a digital wallet provider may include de-contexting and encryption steps on sensitive data but may not remove data from database records because the digital wallet may desire to keep records of all previous purchases in case of a charge-back. Alternatively, a merchant with a specific and/or narrow purpose (e.g., aggregation of online purchase details of a particular product for marketing purposes) for the anonymized data may have received anonymized information that has all unnecessary information removed, sensitive data masked, data separated into various data groupings, and data de-contexted to ensure the highest level of anonymization. Accordingly, the anonymization scheme may protect the individual's data while maintaining function preservation for the merchant.

Furthermore, embodiments of the present invention may leave some data to be searched while minimizing the risk of identification of the underlying consumer in order to provide useful information while still anonymizing the sensitive database. Accordingly, embodiments of the present invention allow for increased performance and system efficiency because only that data that is a security risk may be anonymized and the remaining data may be easily and efficiently searched, stored, and used without having to decrypt the database each time the data is searched, analyzed, or used.

Additionally, by allowing the anonymization of sensitive consumer data, embodiments of the present invention allow for more secure sharing of information between entities. Data may be anonymized without losing the value of the information and as such, the data may be shared more openly with entities that may not meet the standards of certain government or industry standards but may find the information useful. Further, the anonymized data has privacy built into the data records so that data monetization is easily achieved. Accordingly, anonymized datasets may be generated which comprise enough information that you can quickly sell or provide data to different entities or otherwise segment different subscribers to different datasets based on the needs of those subscribers and expectations of consumers.

For example, a merchant that is attempting to target users for a marketing campaign may want to have access to a user database's address information to determine where their consumers are located in the aggregate, without individually identifying each particular consumer. Accordingly, the database may comprise enough information such that each user profile may comprise a street name and zip code and a purchase history so that the consumer may not be identified personally but a typical consumer from a particular zip code or other segmented information for offers may be provided. Accordingly, the information is protected and no encryption was required because the personal information is isolated enough to not provide a security concern.

Accordingly, embodiments of the present invention provide effective and efficient anonymization techniques that allow for flexible implementation and data security for a system. Therefore, processes and methods of the present invention provide the security benefits of encryption without the cost in performance typically associated with encryption.

Prior to discussing the specific embodiments of the invention, a further description of some terms can be provided for a better understanding of embodiments of the invention.

A "message" may include any information that may be transported from one entity to another. Further a message may include a single signal or data packet or a combination of multiple transporting signals. For example, a message may include an analog electrical signal or digital signal that constitutes binary information that may be interpreted as communicating information. Additionally, a message may comprise any number of pieces of information including both private and/or public information. Messages may be communicated internally between devices within a secure organization or externally between a device within a secure organization or network to a device outside of a secure organization, area, or communication network. Messages may comprise any number of private and public information. Additionally, whether information contained within a message is considered public or private may be dependent on who the secure organization or area 120 originating the message is, who the message is being sent to (e.g., recipient computer or requesting computer), or in any other suitable manner. Additionally, messages may be modified, altered, or otherwise changed to comprise anonymized information.

"Private information" and "sensitive information" may include any information that is not to be widely disseminated. It may include any information that is restricted from being sent outside a secure area, organization, computer, database, or any other secure entity. For example, private or sensitive information may include any information that a user, system, organization, or any other entity does not want to share with an external or internal system, user, or computer. For instance, private or sensitive information may include personal information (e.g., name, social security number, address, birthdate, etc.), payment information (e.g., credit card number, primary account number, card verification value (CVV), billing address, expiration date, etc.), proprietary information (e.g., trade secret information, recipes, technical details, manuals, plans, etc.), purchase history (e.g., a consumer's previous purchases at a merchant, using a particular payment account, processor, etc.), employment history, medical history, and any other information that a person, organization, or other entity would like to restrict access to.

Further, the classification of data as private or sensitive may depend on where information is going, where the data is originating from, or the nature of the information. For example, information that may be considered private or sensitive in some contexts may not be considered private or sensitive in other contexts (e.g., if access rights for a recipient computer allow for access to some personal information that would otherwise be considered private information to the general public—e.g., a man may not consider medical records sent to his wife as private information while if the medical records were sent to someone outside his family, they would be considered private). Accordingly, private and sensitive information may be identified through any suitable method including the use of privacy or anonymization rules that indicate to an anonymization engine that a piece of information is considered private. Additionally, information may be determined to be private or sensitive based on the ability to harm a consumer if it were delivered to a malicious third party, to the identified recipient computer, or through any other suitable manner.

Accordingly, privacy rules and anonymization rules may be selected individually or grouped into pre-designed application bundles based on use cases for the anonymized data (e.g., data anonymized for television marketing may be anonymized differently than data anonymized for customer service operations).

A "secure area" may include any area which has restrictions that prevent the transfer of information from within the area to outside the area. For example, a secure area may comprise an organization (e.g., private corporation, government agency, non-profit or other non-governmental organization, etc.), a person's property (person's home or electronic devices), or information held in confidence on behalf of a person (e.g., an email account, social media network profile, medical records, etc.). Other secure areas need not be defined in terms of geographic boundaries, but may include a virtual area in a computer network.

"Privacy rules" or "anonymization rules" may include a set of rules that inform or instruct an anonymization engine as to how to anonymize information. The privacy rules or anonymization rules may analyze data at any level of abstraction (e.g., at the physical layer (i.e., the signals that contain binary information), at an application layer (e.g., fully formed and communicated messages that may be interpreted by a system user), or any other layer in between). Accordingly, privacy rules and anonymization rules may include data type dependent rules (e.g., anonymize all payment information, name information, geographical information, etc.), data field dependent rules (e.g., anonymize all data between fields 1-12 of credit card field for a message defined by international standards organization (ISO), anonymize the first name of every data profile, etc.), may be based on a pattern (e.g., anonymizing the first four digits of each word), data context dependent (e.g., whenever a name and a credit card number is in the same message perform a particular step, etc.), or any other suitable and/or useful scheme. Accordingly, the privacy rules may include any suitable limitations on the type of information that is allowed to be sent outside a secure organization, network, or area.

"Access rights" may include any indicator that informs a system of the level of access another computer, user, or system should be granted. Access rights may be determined through any suitable manner. For example, a user may be provided particular access rights when they register for a service and the user may securely authenticate themselves to the system before any information may be provided. Alternatively, access rights may be provided in a request when a computer requests information from a system (e.g., a system administrator may indicate the access rights when they send data outside a secure area). Further, default access rights level may be provided for all computers unless a particular access rights designation is provided to a system.

"Anonymization" or being "anonymized" may include any process where previously identifiable information is altered (e.g., de-identified). Individual information may not be determined by viewing anonymized individual information. In some embodiments, anonymization may include processes for which an algorithm, code, and/or association for re-identification no longer exists. Alternatively, some embodiments may provide an anonymization recipe, code, map, hidden record, anonymization history, etc. that allows a third party to re-constitute or otherwise re-generate the data. Accordingly, in some embodiments, anonymization steps may be reversed by a recipient or requestor to obtain some or all of the private or sensitive information originally anonymized.

Anonymization processes may comprise any suitable process that can alter data from its original form. They may include any number of process steps including, for example, generalizing the data, suppressing the data, introducing noise into the data, swapping the data, replacing precise data with averages, and any combination thereof. Accordingly, anonymization may be performed according to a number of privacy rules and/or anonymization rules that inform an anonymization engine of which steps to perform on each type of data. For example, according to some embodiments of the present invention, anonymizing a message according to the plurality of privacy rules includes at least two of: removing unnecessary private or sensitive information, masking the private or sensitive information to maintain format, separating the private or sensitive information into associated data groupings, de-contexting the private or sensitive information, and encrypting or tokenizing data.

"Unnecessary information" may include any data that is not required for a predetermined purpose. Whether information is necessary or not may be determined according to the access rights and/or privacy or anonymization rules associated with a request or recipient. For example, if a user computer attempts to send credit card information for a number of cardholders stored on a computer located at a bank to an unregistered personal computer located outside the computer with no access rights indicating the personal computer has a legitimate or business use for the credit card information, the credit card information may be considered unnecessary. Accordingly, privacy rules that remove such information may be selected or associated with the message. Further, if a computer is requesting a plurality of data records related to consumer accounts at a bank for the purpose of performing a marketing campaign, information related to a consumer's social security number, passport number, amounts for recent ATM transactions, etc. may be considered unnecessary information and may be removed. Furthermore, in some embodiments, the more sensitive the information, the higher the likelihood the information may be considered unnecessary if not directly related to the purpose of the requesting or receiving computer.

In some embodiments of the invention, the process of "masking" data may include any method of protecting information by changing the underlying data so that a masked field is no longer equal to the original data but the format is maintained. Once scrubbed, the data in a field must not be able to regenerate back to the original value. Masking may be used when the format of the information is important or should be maintained. Accordingly, a requesting entity may desire the whole format of a piece of data in order to process or otherwise obtain some information regarding the data without identifying an underlying user. Masking may be used to hide some subsets of a piece of data. For example, masking a phone number may include applying a mask to the first three digits, the last four digits, the area code, or any other combination thereof. For instance, a phone number (e.g., 444-456-1114) may be masked by including X's instead of digits (e.g., XXX-456-1114), applying a single numeral (0's or 9's) over the digits (e.g., or 999-456-1114 or 000-456-1114), or any other combination thereof. Accordingly, masking allows a system to easily identify the information based on the format of the underlying data without providing identifiable information (e.g., because without an area code, the personal number is unlikely to inform a system of who the phone number belongs to). Accordingly, masking provides another way to anonymize data without completely removing the data. Masking may be particular useful for data that may be used in a format important context such that a particular type of application, processing, or other analysis function may still perform correctly.

In some embodiments of the invention, the process of "scrubbing" data may include any method of protecting information by changing the underlying data so that a masked field is no longer equal to the original data but the format is maintained. Similarly, the anonymization engine may implement a scrubbing module that is capable of scrubbing private information. Scrubbing may be implemented such that data is completely removed and exchanged with information in the same format. Accordingly, the information may not provide any identifiable information for the underlying user but may provide the format of the information that was removed. Accordingly, analysis programs, existing infrastructure, and any other existing hardware or software may still be capable of processing information without providing private or secure information.

"Separating information into associated data groupings" may include any method of disassociating information and regrouping the information into associated data groupings. For example, a rule may dictate that profile data including personal information, purchase history, payment data, family member profile information, friend information, etc., separate the profile data into a personal information data grouping, a payment data grouping, and a purchase history data grouping. Accordingly, although all the information may be contained in a single data file before anonymization, the data may be split into multiple separate data files that are all associated with different data groupings. The separating of information allows for compartmentalization and allows the service to further refine the data that is anonymized and data that is passed on for a designated purpose. For example, by separating personal information from a profile, the purchase history and payment information may be used for marketing or consumer behavior analysis without being concerned that a consumer may be identified.

Furthermore, separation may be implemented in order to protect the sensitive or private information contained in previously single sensitive record or message. Accordingly, sensitive or private information may be separated in order to minimize the value of each piece of data. Accordingly, if a malicious third party intercepts the data, the data may be incomplete. For example, if a malicious third party can get a credit card number, name, and social security number, it is valuable information. However, if the malicious third party can only get a user's credit card number without any further information, it is not valuable. It is merely a sixteen digit number.

Accordingly, in some embodiments, sensitive or private information may be grouped so that it is less valuable. For example, if a data record comprises a name, CVV, account number, and expiration date, the anonymization engine may group the name and the account number together and the CVV and expiration data together because those two data groupings are less valuable than all four pieces of information combined. Accordingly, if either grouping was intercepted by a malicious third party, the third party would not be able to cause any harm.

In some embodiments, the process of "de-contexting" data may include any method of switching, repackaging, moving, or otherwise changing the context in which data may be presented in order to make the data less sensitive and/or private. There are numerous manners in which to de-context data. For example, the data within the file could be ranked by sensitivity and the most sensitive data could be removed from a data record or placed in a different data grouping in order to remove the sensitive context of the data. For example, a portion credit card number may be input into a field that appears to be a telephone number. Accordingly, the sensitivity level of information may be neutralized when removed from a sensitive context.

In embodiments of the invention, "tokenization" may include any process of replacing sensitive data with surrogate data that may fill in as a reference for the original.

In some embodiments of the invention, "anonymized information/data" or "de-identified information/data" may include any information or data that has enough personally identifiable information ("PII") removed or obscured, such that the remaining information does not identify an individual and there is no reasonable basis to believe that the information can be used to identify an individual.

A "hidden record" may include any record that is not easily identifiable without diagnostic or other specialized tools. For example, meta data or other data that is embedded into documents in addition to the perceivable substance of the documents may be considered a hidden record. A hidden record may be embedded into anonymized information in order to identify which steps have been executed on anonymized data such that some of the anonymization steps may be reversed.

"Cryptography" may include the enciphering and deciphering of messages in secret code or cipher or the computerized encoding and decoding of information.

I. Exemplary Privacy Firewall Systems

FIG. 1 shows an exemplary block diagram illustrating an exemplary privacy firewall system 100, according to one embodiment of the present invention. The privacy firewall system 100 comprises a user computer 110 located in a secure organization or secure area 120 attempting to communicate with a recipient computer located outside an unsecured organization or area. The privacy firewall system 100 may further comprise a privacy computer 130 located within the secure organization or secure area 120 that is configured to intercept or otherwise receive communications leaving the secure area 120.

Firewalls may have network appliances that can be applied to multiple different OSI layers of a network system. Accordingly, different firewalls may analyze data at multiple layers and are designed to intercept certain information at certain layers. Typically, enterprise environments are protected by firewalls in order to protect an enterprise or organization from attacks from the outside of the organization. However, typically for breaches of security, data is removed from the enterprise environment by a hacker gaining access to a data resource within the enterprise environment and then sending the data outside the secure area.

Accordingly, a privacy computer 130 may allow the organization to protect the privacy of their users, the organization, and any other stake holders, no matter how the data breach occurs. As long as the data is transmitted outside the enterprise environment through a communications network 160, the privacy computer 130 may analyze the data being sent outside the environment to ensure no private information is being transmitted outside the secure area 120 that is not within the access rights of the recipient computer 140. Accordingly, even if an intruder is able to gain access to data, when the intruder attempts to remove the data from the secure area 120, the data is going to be anonymized such that is not useful for malicious purposes.

The privacy computer 130 may analyze the context of information inside received messages to determine if the information constitutes private information, and can choose the correct combination of anonymization processes based on the sensitivity or privacy level of the private information in the message. For example, the privacy computer 130 may be able to determine that a credit card number is enclosed in an email message and may remove, mask, scrub, separate, or de-context the credit card number in order to anonymize or otherwise the sensitive information from being sent outside a secure area or organization. The privacy computer 130 may determine the context of the message by analyzing who the message is being sent to by determining the access rights of the recipient computer 140 or determining the predetermined set of privacy rules associated with the recipient computer 140.

The secure organization or secure area 120 may include any suitable location and may include a real geographic area or may correspond to a secure virtual network in which a number of different computers have access to around the world.

A user computer 110 may comprise any suitable computer or other electronic device that is capable of communicating information to another device. For example, the user computer 110 may comprise a mobile device (e.g., smartphone, tablet device, pager, etc.) that is capable of connecting to a communications network within a secure area or any other device that is connected to a secure network or other area. Accordingly, the user computer 110 may have access to private information in the form or access to a secure or private database of private information 111. Alternatively, the user may provide private information as a user input into the user computer 110 and attempt to send the private information outside of the secure area 120. The user computer 110 may be coupled to a secure communications network 121 that allows the user computer 110 to communicate with computers outside of the secure area 120 as well as computers (e.g., user computer 110) within the secure organization or secure area 120.

A privacy computer 130 may include any suitable computer or other electronic device that is capable of intercepting or receiving communications from within a secure area. The privacy computer 130 may comprise a processor and a computer-readable medium coupled to the processor. The computer-readable medium may comprise code executable by the processor for performing a method. The method may comprise receiving a message including private information directed at a recipient computer 140 located outside the secure area, identifying the private information using a plurality of privacy rules, anonymizing the message according to the plurality of privacy rules, and forwarding the message including anonymized information to the recipient computer 140 located outside the secure area. The privacy computer 130 may be coupled to the user computer 110 and a recipient computer 140 through one or more communication networks. The privacy computer 130 may further be coupled to a privacy rules database.

The privacy rules 131 may be stored in any suitable memory, database, or other information storage device that is capable of communicating with a privacy computer 130. The privacy rules 131 may be organized by access rights, recipient identifier, or any other suitable method. For example, a set of privacy rules may be configured for each recipient system or the set of privacy rules may be configured for the secure organization or area 120. Accordingly, the set of privacy rules that are used to anonymize the message may be selected based on the user computer 110, the secure organization 120, or the recipient computer 140. Further, the privacy rules may be based on access rights or may be based directly on a recipient computer identifier, a user computer identifier, or may be applied to all data leaving the secure organization or area 120.

A communications network may be instituted using any communications protocol and any series of hardware or software applications that are necessary in order to transmit messages or any other packets of information may be transmitted between two computers. The communications network may be the internet, a cellular phone network, or any other type of communications network that devices may connect to.

The secure communications network may include a communications network that limits access to the communications network for some entities. Accordingly, the secure communications network may require a user computer 110 be authorized to access the secure communications network in order to obtain data through the secure communications network or send data outside the secure organization or area 120 to an unsecured organization or area.

The unsecured organization or unsecured area may include any area, organization, or computer located outside of the secured organization or secure area. Additionally, the unsecured organization or unsecured area could conceivably be within the secure organization or secure area 120 if the recipient computer 140 is not trusted or otherwise not connected to the secure communications network.

Furthermore, in some embodiments, the secure organization or secure area 120 may be a subsidiary, business unit, secure team, or otherwise may be located within a larger organization or area. Further, in some embodiments, the recipient computer 140 may be coupled to the user computer 110 through a secure communications network but located outside the secure subsidiary, business unit, or area within the secure organization 120. Accordingly, the recipient computer 140 may be any computer located within or outside an organization and the designation as a recipient computer 140 may be determined according to the access rights or trust level of the recipient computer 140.

The recipient computer 140 may comprise any electronic device capable of communicating with another computer. For example, the recipient computer 140 may include a mobile device, a tablet, or any other electronic device capable of connecting or communicating through a communications network. Accordingly, the recipient computer 140 may receive a message comprising anonymized information once the privacy computer 130 has anonymized a message sent through the secure communications network.

In some embodiments, a set of privacy rules may be provided to a recipient computer 140 such that the recipient computer 140 is capable of recreating some or all of the private information that is anonymized by the privacy computer 130. The set of privacy rules may be provided to the recipient computer in order to provide some insight into the anonymized data that is received by the recipient computer 140. Accordingly, for recipient computers 140 that are authorized to receive anonymized information (and the private information that may be gained by reversing the anonymization process) from the secure organization 120, the set of privacy rules may be provided to the recipient computer so that some of the private data may be recreated by reversing the anonymization processes applied to the private data.

The set of privacy rules may be provided through any suitable method including that when the privacy rules associated with the recipient computer 140 are designed, configured, or otherwise set, the recipient computer 140 may save a version of the set of privacy rules 141 that may be applied to messages being sent to the recipient computer 140. Accordingly, if the recipient computer 140 has access to the set of privacy rules 141 applied to the private information in a message, the recipient computer 140 may reverse the anonymization processes to obtain some or all of the privacy information, depending on the anonymization processes used to anonymize the private information. The recipient computer 140 may be capable of reverse some or all of the anonymization processes depending on the scope of the anonymization processes (i.e., the amount of data that was anonymized), the type of anonymization processes implemented (Le., the specific number and types of anonymization processes used), and the availability of private information by the recipient computer 140 (i.e., if the recipient computer 140 can recreate some private data by have separate access to other private data records associated with the message).

In some embodiments, the anonymization processes implemented by the privacy computer may permanently alter the data to make it unusable by the recipient computer 140. Accordingly, the privacy computer 130 may implement scrambling, polymorphism, or any other suitable method to hide the private data. These one-way crytographic techniques may be used when the recipient computer 140 is unrecognized, included on a black list, or the private data is very sensitive.

Figure 2:
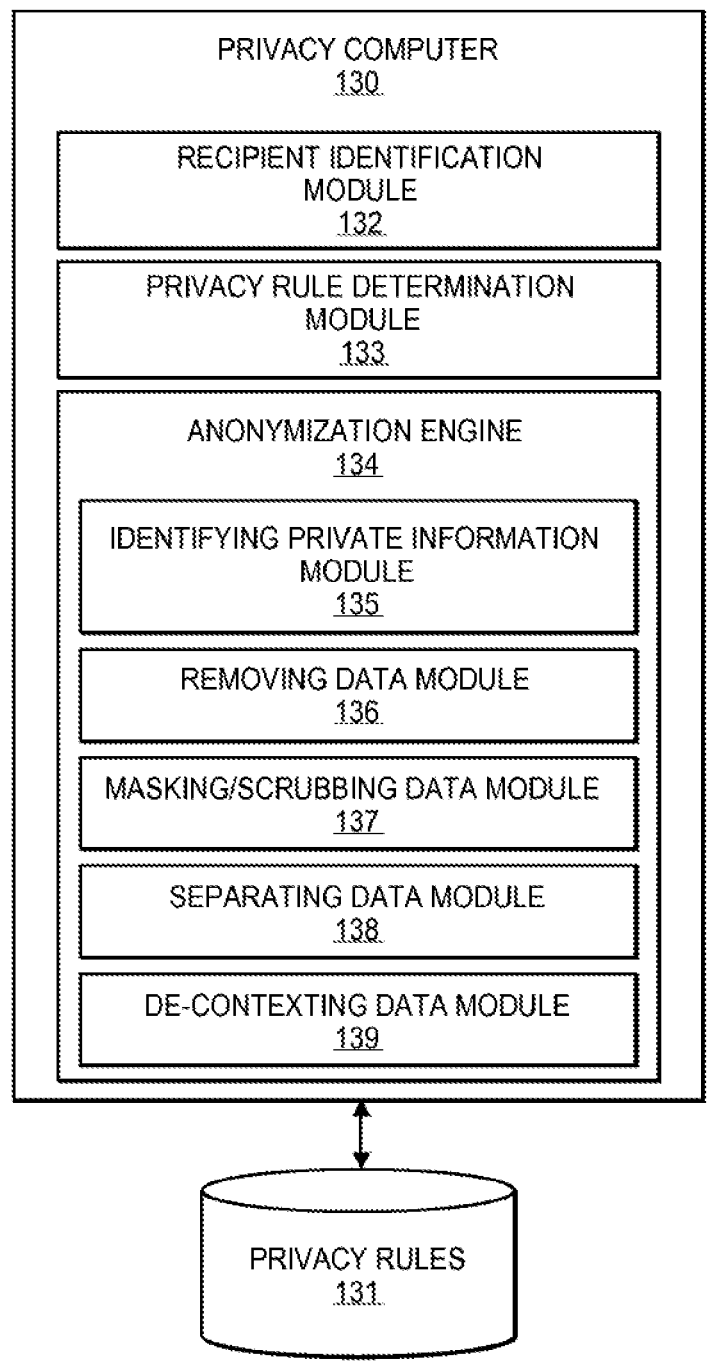
FIG. 2 shows a block diagram illustrating an exemplary privacy computer, according to one embodiment of the present invention.

FIG. 2 shows a block diagram illustrating an exemplary privacy computer 130. The privacy computer 130 may comprise a number of modules including a recipient identification module 132, a privacy rules determination module 133, and an anonymization engine 134. Further, as explained above, the privacy computer 130 may be coupled to a privacy rules database 131 or other memory comprising a plurality of privacy rules.

The recipient identification module 132 may include software that allows a privacy firewall to receive a communication from a user computer 110 and identify a recipient associated with the message. The recipient identification module 132 may determine the recipient computer 140 through any suitable method and may access any additional system resources, recipient identifier look up tables, registered recipient computer databases, or any other information in order to determine the identity of the recipient computer 140. For example, the recipient identification module 132 may parse the internet protocol (IP) address destination for the message (e.g., the message may be sent to a an enterprise email account or to a public email address), the content of the message may identify the recipient computer 140 or an organization associated with the recipient computer 140 (e.g., a header or other information within an email or message may be analyzed to determine who the message is being sent to), or through any other suitable method.

The privacy rules determination module 133 may include a software module on the privacy computer 130 that is configured to determine a set of privacy rules to apply to the message depending on the identification of the recipient computer 140. The privacy rules determination module 133 may determine associated privacy rules through any suitable method.

The anonymization engine 134 may comprise a number of different modules that allow the anonymization engine 134 to customize the anonymization level for each type of data it anonymizes, based on the privacy rules being implemented. The use of the various anonymization process modules 135-139 may be directed by the privacy rules that are implemented for each recipient or secure organization 120. Accordingly, the anonymization engine 134 may comprise an identifying private information module 135, a removing data module 136, a masking and/or scrubbing module 137, a separating data module 138, and a de-contexting data module 139.

The privacy computer 130 may use any number or combination of the anonymization processing modules 136-139 depending on the sensitivity and/or privacy level of the underlying data as well as depending on the access rights of the recipient computer 140 (which may impact the privacy rules that are applied for the recipient computer 140). Accordingly, the anonymization engine 134 may use a combination of the various anonymization techniques based on the privacy rules associated with the data.

For example, a privacy rule may include that social security numbers should be removed for all messages, the street numbers for billing addresses should be masked, profile information and credit card information should be separated, and that credit card numbers and expiration dates should be de-contexted. Accordingly, because the data included in the message is very sensitive (a credit card account profile including payment credentials), multiple anonymization steps including combinations of multiple anonymization processes are used. However, if the message merely includes a first and last name of a consumer, the first name may be masked and the message may be forwarded. Accordingly, the less sensitive data (e.g., consumer name), without more sensitive data included, may have a single or even no anonymization processes applied to it.

Further, depending on the access rights of the recipient computer 140, different data may be identified as private and different anonymizaton processes may be applied. For example, a message comprising a name and a social security number may have the social security number completely removed and the name de-contexted for recipients that are unknown or unregistered with the privacy computer 130. However, the social security number may merely have the first 3 digits and the last name masked for recipients that are registered and known by the privacy computer 130. Accordingly, known recipient computers 140 with more access rights may be provided with more information than unknown recipients or recipients with fewer or lower access rights.

The identifying private information module 135 may include a software module configured to analyze a set of privacy rules and identify whether private information corresponding to the privacy rules is present in a message. Privacy rules can include, for example, that the anonymization engine 134 should remove any social security numbers in the message. Accordingly, the identifying private information module may analyze a message for information that looks like a social security number. If the private information is identified within the message, the privacy computer 130 may anonymize the private information using the anonymization engine 134.

For example, a private organization may want to allow more information to be delivered to a recipient computer 140 at a partner organization without anonymizing the entire message. Accordingly, the privacy firewall may be configured to have different privacy rules apply to different recipient computers 140. Therefore, recipient computers 140 may have customizable access rights (e.g., privacy rules that indicate the sensitivity level of data that is allowed to be sent to them) that may be impact the anonymization processes applied to a message or secure data record. Accordingly, a system administrator for the secure organization 120 or any other trusted entity could tailor the type of private information provided to each recipient computer 140 or to all recipient computers 140.

The removing data module 136 may include a software module configured to remove identified private information that is found in a message, according to a set of privacy rules or access rights. The removing data module 136 may be called by the anonymization engine 134 when a privacy rule or anonymization rule calls for some private or sensitive information to be removed from a message or secure data record.

In some embodiments, after the removing data module 136 removes the sensitive or private data from the message or sensitive data record, the sensitive data record or message with the unnecessary private or sensitive information removed, may be stored in a local memory 126 of the server computer 120 for the next module to continue the anonymization of the data record or message. The removing data module 136 may also optionally store the sensitive data that is removed in a removed sensitive data database 221 so that the sensitive data record may be recreated in the future. Each and every anonymization module may implement a similar process of storing the message with the anonymized data after each anonymization step and storing the removed, scrubbed, or anonymized data in a separate database.

Alternatively, in some embodiments, the anonymization modules 136-139 could merely flag the private data to be removed, masked, scrubbed, separated, or de-contexted by the anonymization engine 134 after all the privacy rules have been applied. The anonymization processing modules 136-139 may also save the removed, masked, and/or scrubbed data to a corresponding database for later recreation of the message.

The masking and/or scrubbing module 137 may include a software module configured to mask and/or scrub identified private information that is found in a message, according to one or more privacy rules.

The separating data module 138 may include a software module configured to separate identified private information that is found in a message into designated groupings including separate files, areas of a message, or any other suitable separation of data, according to a set of privacy rules. The groupings may be defined by the privacy rules and may be implemented in any suitable manner and data may be separated into any suitable number of groupings.

The de-contexting data module 139 may include a software module configured to de-context identified private information that is found in a message, according to a set of privacy rules. The de-contexting data module 139 may de-context data in previously separated data groupings or may use de-context data from a group of multiple different data groupings. The de-contexting data module 139 may de-context data in any suitable manner. For example, the de-contexting data module 139 may switch the expected position of data such that it no longer makes sense in the presented context (e.g., switching a credit card number with a name field in a message), may encrypt elements from the groupings to transform sensitive data to meaningless data (e.g., may encrypt any information that gives context to sensitive data included in the message—e.g., may encrypt a field heading, title, or other information to inform a system of the context of the data), may add information to a data record to make the sensitive or private information less meaningful (e.g., pad a credit card number with 16 additional digits so that it no longer has the format of a credit card number), may take sensitive data and put it in a new context (e.g., input data fields into pre-generated statements, quotes, songs, etc. that render the data useless or nonsensical unless you know the relationships for de-contexting the information, or may implement any other suitable methods.

The process of anonymizing the message will be described in further detail in reference to FIGS. 3 and 4 below.

II. Exemplary Methods of Implementing a Privacy Firewall

As described above, the privacy firewall system 100 may be configured to detect private information and make sure that no unauthorized private information can be passed through the privacy firewall to a recipient outside the network, secure organization 120, business unit, or any other designated protected zone, area, region, etc.

For example, a secure organization 120 may use the firewall system 100 to limit the loss of sensitive data from data centers. Accordingly, privacy rules may be established for the secure area or for a recipient computer 140 that if data is attempted to be sent outside of the secure organization 120 that comprises consumer names (first name or last name), payment credentials (e.g., credit card number, CVV, PIN, expiration date, etc.), or any other sensitive information, then the private information is anonymized from the message. Using privacy rules, the privacy firewall may be configured to detect and anonymize any type of private information.

Figure 3:
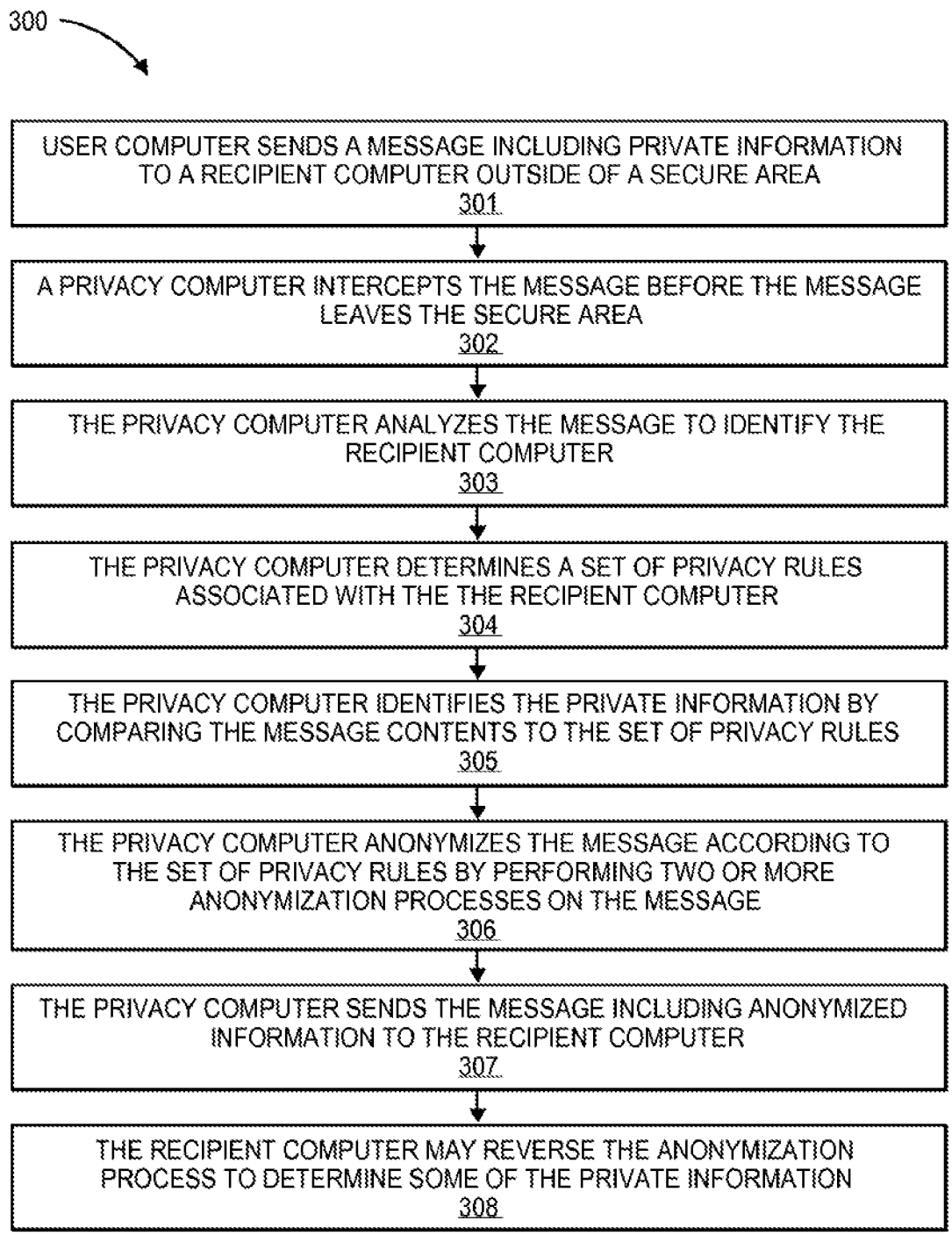
FIG. 3 shows a flowchart illustrating an exemplary method of anonymizing a message comprising private information, according to embodiments of the present invention.

FIG. 3 shows a flowchart illustrating an exemplary method of anonymizing a message comprising private information, according to embodiments of the present invention.

At step 301, the user computer 110 inside a secure area sends a message including private information to a recipient computer 140 located outside of a secure area.

At step 302, a privacy computer 130 intercepts the message before the message leaves the secure area. The privacy computer 130 may be positioned within the communications infrastructure of the secure organization or secure area 120 such that the privacy computer 130 may be able to analyze all information leaving the secure organization or area 120. Accordingly, the privacy computer 130 may be capable of analyzing all data packets from communications before any packets or the messages that are made up of the data packets are transferred out of the secure organization 120.

At step 303, the recipient identification module 132 of the privacy computer 130 analyzes the message to identify the recipient computer 140. As explained above, the recipient identification module 132 may determine the recipient computer 140 through any suitable method. For example, the recipient identification module 132 may parse the Internet protocol (IP) address destination for the message (e.g., the message may be sent to a an enterprise email account or to a public email address), the content of the message may identify the recipient computer 140 or an organization associated with the recipient computer 140 (e.g., a header or other information within an email or message may be analyzed to determine who the message is being sent to), or through any other suitable method.

At step 304, the privacy rules determination module 133 of the privacy computer 130 determines a set of a plurality of privacy rules associated with the recipient computer 140. The plurality of privacy rules may be stored in a privacy rules database 131 that is coupled to the privacy computer 130 and comprises privacy rules that may be used to anonymize private or sensitive data in a message or secure data record. Once the recipient computer 140 is identified, the privacy rules associated with the recipient computer 140 may be determined through any suitable method. For example, a set of privacy rules may be stored at the privacy computer 130 for the recipient computer 140. The set of privacy rules may be customized to the trust or security level of the recipient computer 140 by the secure organization 120. The set of privacy rules identify the private information that should be anonymized before a message is allowed to be transferred. In some embodiments, each recipient computer 140 that may communicate with the secure organization 120 may be provided with a set of privacy rules that correspond to particular access rights. In other embodiments, all recipient computers 140 located outside the secure organization or area 120 may have the same privacy rules applied sent At step 305, the identifying private information module of the privacy computer 130 identifies the private information in the message by comparing the private information in the message to the set of the plurality of privacy rules. The anonymization module may identify the private information by determining the type of information that is the subject of the privacy rule and analyzing the message for the type of information. The privacy computer 130 may analyze the message for the data types by searching for common data formats (e.g., ISO standards, etc.), data groupings (e.g., a 10 digit number in a grouping with other address and demographic data may indicate a phone number, etc.), particular key words (e.g., consumer profile, credit card number, etc.), identified file types (e.g., the system may compare the message and information in the message to a database of known profile files to determine if there is a match, etc.), or any other suitable method of parsing message content and identifying relevant private information contained therein.

At step 306, the privacy computer 130 anonymizes the message according to the set of privacy rules by performing two or more anonymization processes on the message. The number and order of the anonymization processes applied to the private information is determined by each privacy rule. An exemplary process for identifying privacy information and anonymizing private information according to a plurality of privacy rules is shown and described further in the method shown in FIG. 4.

Figure 4:
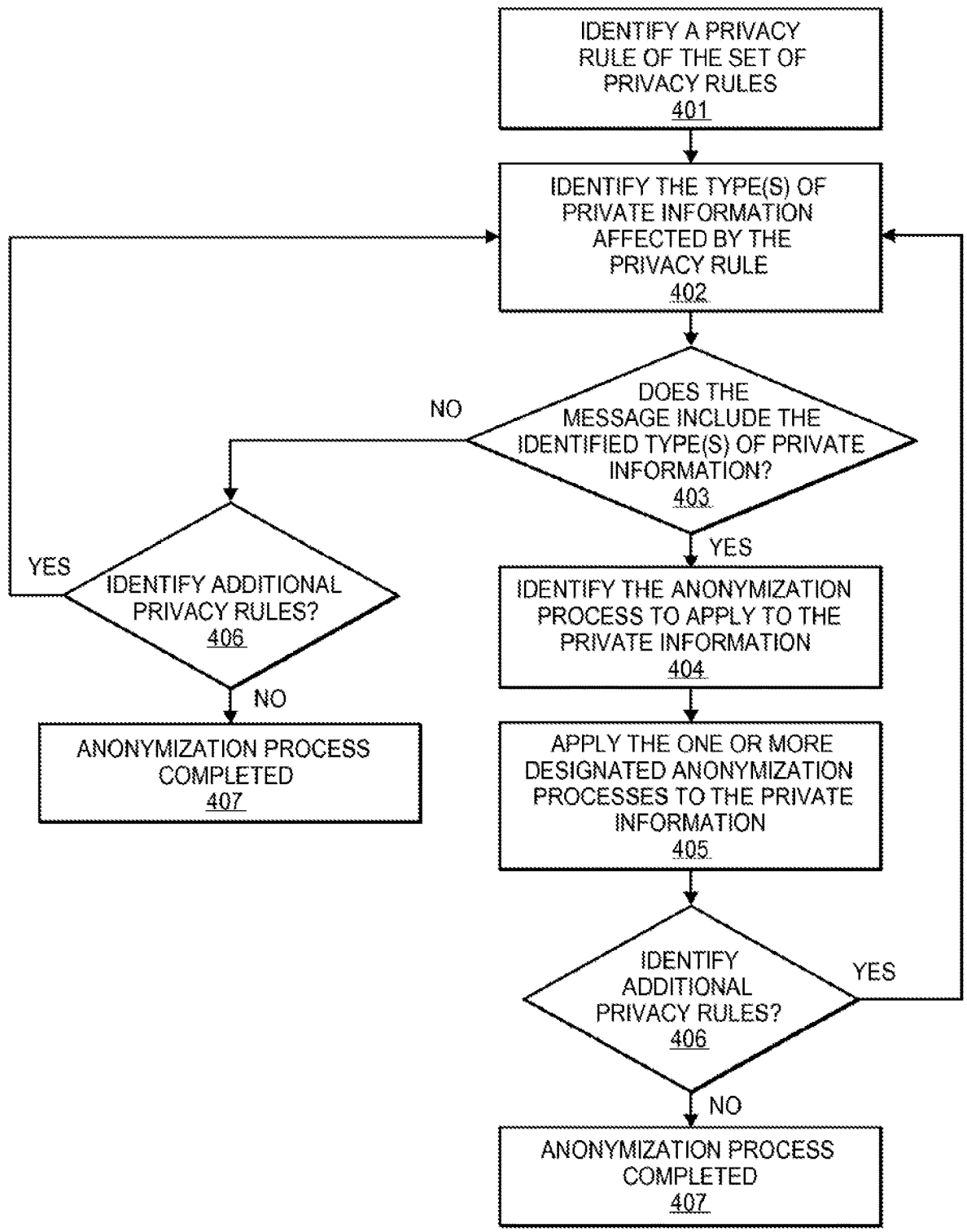
FIG. 4 shows an exemplary method of identifying privacy information and anonymizing the privacy information according to a set of privacy rules, according to embodiments of the present invention.

FIG. 4 shows an exemplary method of identifying privacy information and anonymizing the privacy information according to the determined set of privacy rules.

At step 401, the anonymization engine 134 identifies a privacy rule from the determined set of plurality rules. For example, a recipient computer 140 may be associated with a set of privacy rules that contains 10 different privacy rules, one of which states that instructs that any social security numbers in a message should be removed.

At step 402, the anonymization engine 134 identifies the type or types of private information affected by the privacy rule. Using the example above, the type of private information affected by the privacy rule include data that is corresponds or identifies a social security number. Accordingly, the anonymization engine 134 may determine the various formats that social security numbers may be displayed or contained within a message. For example, social security numbers are most commonly provided as three digits, a dash, two digits, a dash, and four digits. Alternatively, the social security number may be provided as nine numerals in a row. Further, the anonymization engine 134 may determine that social security numbers may be referred to as a person's "social," a "SSN," and any other slang that is commonly used for social security numbers.

At step 403, the anonymization engine 134 determines if the message includes the identified type or types of private information. As explained above, any method may be used to determine if a social security number is present in the message. Using the example above, the anonymization engine 134 may search the message and any attached documentation, files, etc., for the criteria associated with social security numbers that are determined in step 402 above. If the message includes one or more of the identified types of private information, the anonymization engine 134 applies the privacy rule as described in steps 404 and 405 below. However, if the message does not include the one or more identified types of private information, the anonymization engine 134 may skip the privacy rule and identify any other privacy rules (step 406), as described below.

At step 404, the anonymization engine 134 identifies the anonymization process to apply to the private information based on the privacy rule. If the privacy rule is triggered by the anonymization engine 134 finding one of the privacy rule criteria in the message, the anonymization engine 134 may determine an anonymization process that is identified in the privacy rule. Privacy rules may comprise a single anonymization process or a combination of multiple anonymization processes. Using the example above, the privacy rule includes only a single anonymization process, removal of the identified private information.

At step 405, the anonymization engine 134 applies the one or more identified anonymization processes to the private information. Using the example above, the social security number may be removed from the message. Further, the removal process may also remove the found search criteria that was used to identify the private information. For example, if the message included the statement, "Joan's social security number is 111-11-1111," the anonymization engine 134 may remove the social security number itself, the entire statement, the search criteria "social security number," or any combination thereof. Additional examples may be provided in more detail and the process may be described in further detail below in regards to the exemplary anonymization process shown in FIG. 5.

At step 406, the anonymization engine 134 determines whether there are additional privacy rules that have not been applied to the message. If so, the process restarts by returning to step 402. This process continues until all of the privacy rules are executed.

At step 407, if the anonymization engine 134 determines that there are no more additional privacy rules and thus, the anonymization process ends. Accordingly, the message now includes no more private information, as defined by the privacy rules. As such the private information is anonymized and now includes anonymized information.

Returning to FIG. 3, at step 307, the privacy computer 130 sends the message including the anonymized information to the recipient computer 140 over the communications network.

In some embodiments, at step 308, the recipient computer 140 may reverse the anonymization process using the set of privacy rules to determine some of the private information that was anonymized. As described above, the set of privacy rules may be shared with particular recipient computers 140 that are authorized to receive some private information. Accordingly, in some embodiments, the anonymization step may be reversed by the recipient computer 140 to obtain some or all of the private information. If the anonymization computer 620 has access to the privacy rules that may be applied to a message, the recipient computer 140 may reverse the anonymization processes by determining the data that was de-contexted and/or separated. For example, if the recipient computer 140 has access to the de-contexting rules, the de-contexting steps may be reversed to provide context to the anonymized data. For example, if a credit card expiration date (e.g., 8/16) and a card verification value (e.g., 9423) for a cardholder account is de-contexted by switching the expiration date and the CVV in a consumer profile, the recipient computer 140 that has access to the set of privacy rules could determine the correct expiration date and CVV value by reversing the de-contexting step and switching the expiration date and CVV back to their proper contextual relationship. Similarly, the privacy rules that separate data into groupings may be used to regenerate the original message by reversing the separation process.

However, the data that is removed, masked, or scrubbed may be more difficult to reverse the anonymization process, as the data may no longer be present in the anonymized message. For example, using the example described above, the social security number that was removed from the message may not be able to be recovered, even if the recipient computer 140 is aware a social security number was originally in the message.

Accordingly, some embodiments of the present invention may incorporate a map or other hidden record that may be embedded into the set of privacy rules or the message itself. The hidden record may be encrypted and may include a map or other data that provides instructions to a recipient computer 140 of how to reverse the anonymization process. Using the example above, if the social security number were removed, the hidden record may be embedded into the meta data of the message, may be sent at a later unrelated time and have some information within it to tie the map to the previous message, or may be provided to a recipient computer 140 through any other suitable method. Accordingly, the map may state that a social security number of "111-11-1111" was removed from the message. Accordingly, the recipient computer 140 may then reverse the anonymization using the steps provided by the map or other hidden record.

III. Exemplary Anonymization Methods

Figure 5:
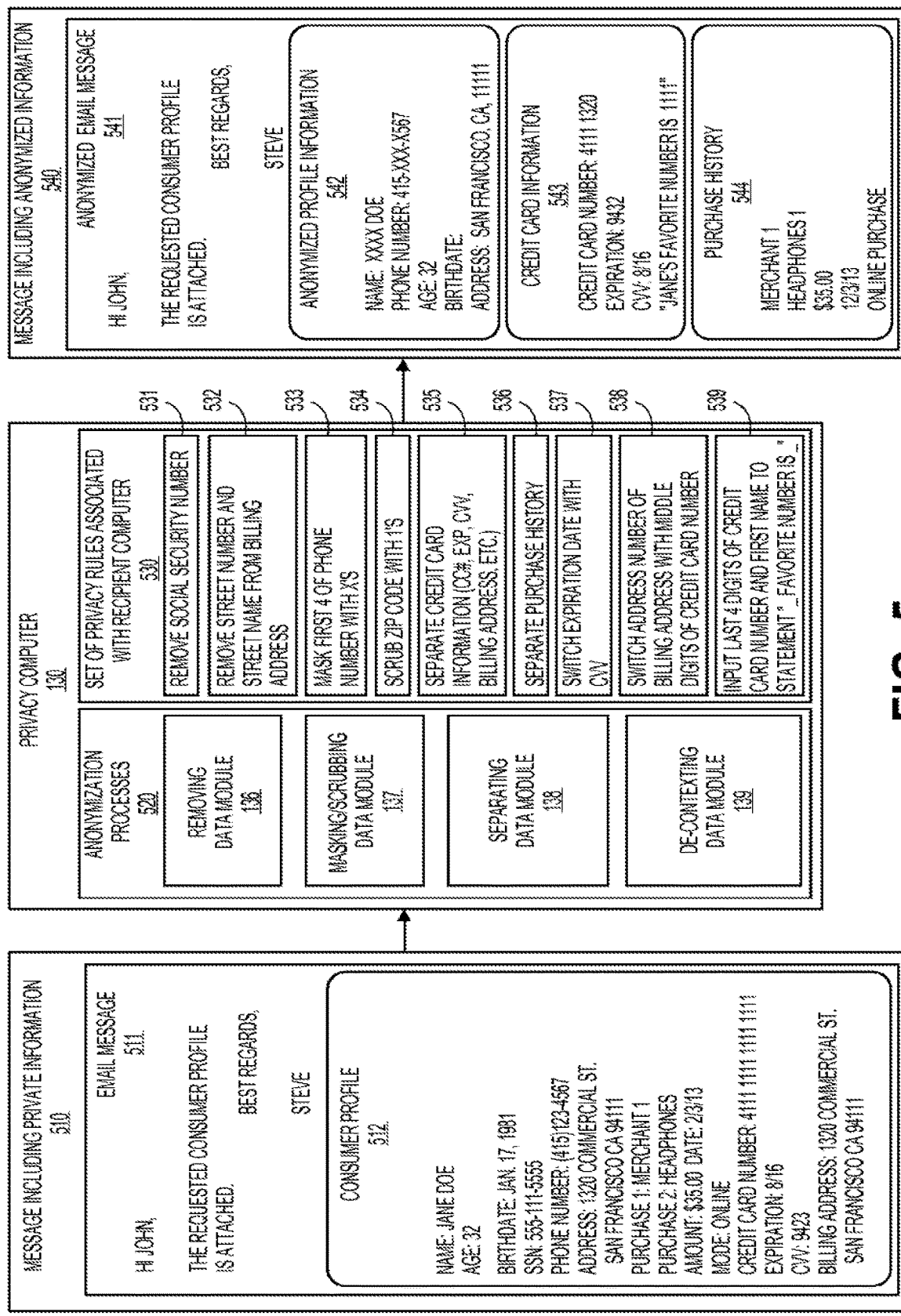
FIG. 5 shows a flowchart illustrating an exemplary method of anonymizing a message including private information, according to embodiments of the present invention.

FIG. 5 shows an example of a message including private information 510 being received by a privacy computer 130 including exemplary anonymization processes 520 for the message 510 using an exemplary set of privacy rules 530 associated with an recipient computer (not shown). After the exemplary anonymization processes 520 are completed using the set of privacy rules 530, a message including anonymized information 540 may be sent to a recipient computer 140 outside of a secure area.

Accordingly, FIG. 5 shows a message comprising private information (e.g., the consumer profile 512). As explained previously (in reference to FIG. 4), the privacy computer 130 has already identified the recipient computer 140 and identified a set of privacy rules 530 associated with the recipient computer 140 (or with the secure area, organization, or all external communications). Accordingly, the anonymization engine 134 may identify each privacy rule 531-539 (step 401), identify the type of private information affected by the privacy rule (step 402), identify if the message comprises private information by comparing the message to the set of privacy rules (step 403), determine one or more anonymization processes 136-139 associated with each privacy rule 531-539 (step 404), and apply the one or more anonymization processes to the private information (step 405). Thereafter, the anonymization engine 134 may repeat the process for the next privacy rule until each of the set of privacy rules has been run and the message contains no more private information.

In the example shown in FIG. 5, the message including private information 510 includes an email message 511 comprising text with a consumer profile 512 attached. The consumer profile 512 includes multiple pieces of private information including name, age, birthdate, social security number, phone number, address, previous purchase information, and credit card information. Accordingly, the privacy computer 130 starts to analyze and process the privacy rules 531-539.

First, privacy rule 531 instructs the anonymization engine 134 to remove social security numbers from the message. Accordingly, the anonymization engine 134 determines if the message includes a social security number (which it does), identifies the removing data module 136 as the anonymization process to apply for privacy rule 531, and applies the removing data module 136 to the social security number to remove the social security information from the message. Accordingly, the message including the anonymized information does not contain the social security number of the original consumer profile.

Privacy rule 532 instructs the anonymization engine 134 to remove street number and street name from any address. Accordingly, the anonymization engine 134 determines if the message includes a street number and name (which it does), identifies the removing data module 136 as the anonymization process to apply for privacy rule 532, and applies the removing data module 136 to the street number and name to remove the information from the message. Accordingly, the message including the anonymized information does not contain the street name or number of the original consumer profile.

Privacy rule 533 instructs the anonymization engine 134 to mask the first four digits of any phone number with X's. Accordingly, the anonymization engine 134 determines if the message includes a phone number (which it does), identifies the masking and/or scrubbing module 137 as the anonymization process to apply for privacy rule 533, and applies the masking and/or scrubbing module 137 to the phone number to mask the first four digits of the phone number with X's. Accordingly, the message including the anonymized information does not contain the first four digits of the phone number and instead includes X's. Further, because the data was masked, the format for the phone number was maintained during the anonymization process.

Privacy rule 534 instructs the anonymization engine 134 to scrub any zip codes with 1's. Accordingly, the anonymization engine 134 determines if the message includes a zip code (which it does), identifies the masking and/or scrubbing module 137 as the anonymization process to apply for privacy rule 534, and applies the masking and/or scrubbing module 137 to the zip code to scrub the data from the message with 1's. Accordingly, the message including the anonymized information contains a zip code of 11111.

Privacy rule 535 instructs the anonymization engine 134 to separate credit card information (including credit card number, expiration data, CVV, and billing address) into a credit card information file 543. Accordingly, the anonymization engine 134 determines if the message includes any of the credit card information (which it does), identifies the separating data module 138 as the anonymization process to apply for privacy rule 535, and applies the separating data module 138 to the credit card information to separate the credit card information from the message into a separate credit card information grouping file 543. Accordingly, the message including the anonymized information 540 now has two separate attachments, one for the profile information and one for the credit card information.

Privacy rule 536 instructs the anonymization engine 134 to separate purchase history information (including merchant, product, amount, date, and shopping method) into a purchase history file 544. Accordingly, the anonymization engine 134 performs a similar series of steps to those just described. Accordingly, the message including anonymized information 540 now has three separate attachments, one for the profile information 542, one for the credit card information 543, and one for the purchase history information 544.

Privacy rule 537 instructs the anonymization engine 134 to switch any expiration date of the credit card information with a CVV value. Accordingly, the anonymization engine 134 identifies the de-contexting data module 139 as the anonymization process to apply for privacy rule 537, and applies the de-contexting data module 139 to the credit card information grouping 543 to switch the expiration date and the CVV value. Accordingly, the message including the anonymized information has the information switched.

Privacy rule 538 instructs the anonymization engine 134 to switch the billing address street number with the middle digits of the credit card number. Accordingly, the anonymization engine 134 identifies the de-contexting data module 139 as the anonymization process to apply for privacy rule 538, and applies the de-contexting data module 139 to the billing address in the profile information grouping 541 and the credit card information grouping 542 to switch the billing address street number and the middle digits of the credit card number. Accordingly, the message including the anonymized information 540 has the information switched.

Privacy rule 539 instructs the anonymization engine 134 to input the last four digits of the credit card number and the first name into the statement "_____'s favorite number is _____." Accordingly, the anonymization engine 134 identifies the de-contexting data module 139 as the anonymization process to apply for privacy rule 539, and applies the de-contexting data module 139 to the credit card information grouping 543 to include the instructed statement, "_____'s favorite number is _____," as instructed. Accordingly, the message including the anonymized information has the statement with the last four digits of the credit card number and the first name input into the statement.

Furthermore, the first name of the consumer was masked as a corollary to using it in the statement. Accordingly, this is an example where a second anonymization process (e.g., masking and/or scrubbing module 137) may be used in a single privacy rule, Accordingly, the message including private information may be anonymized by the privacy computer 130 according to a set of privacy rules associated with the recipient computer 140, secure organization or area 120, or any other suitable means for determining the level of trust for a recipient computer 140.

IV. Exemplary Database Anonymization Systems

Figure 6:
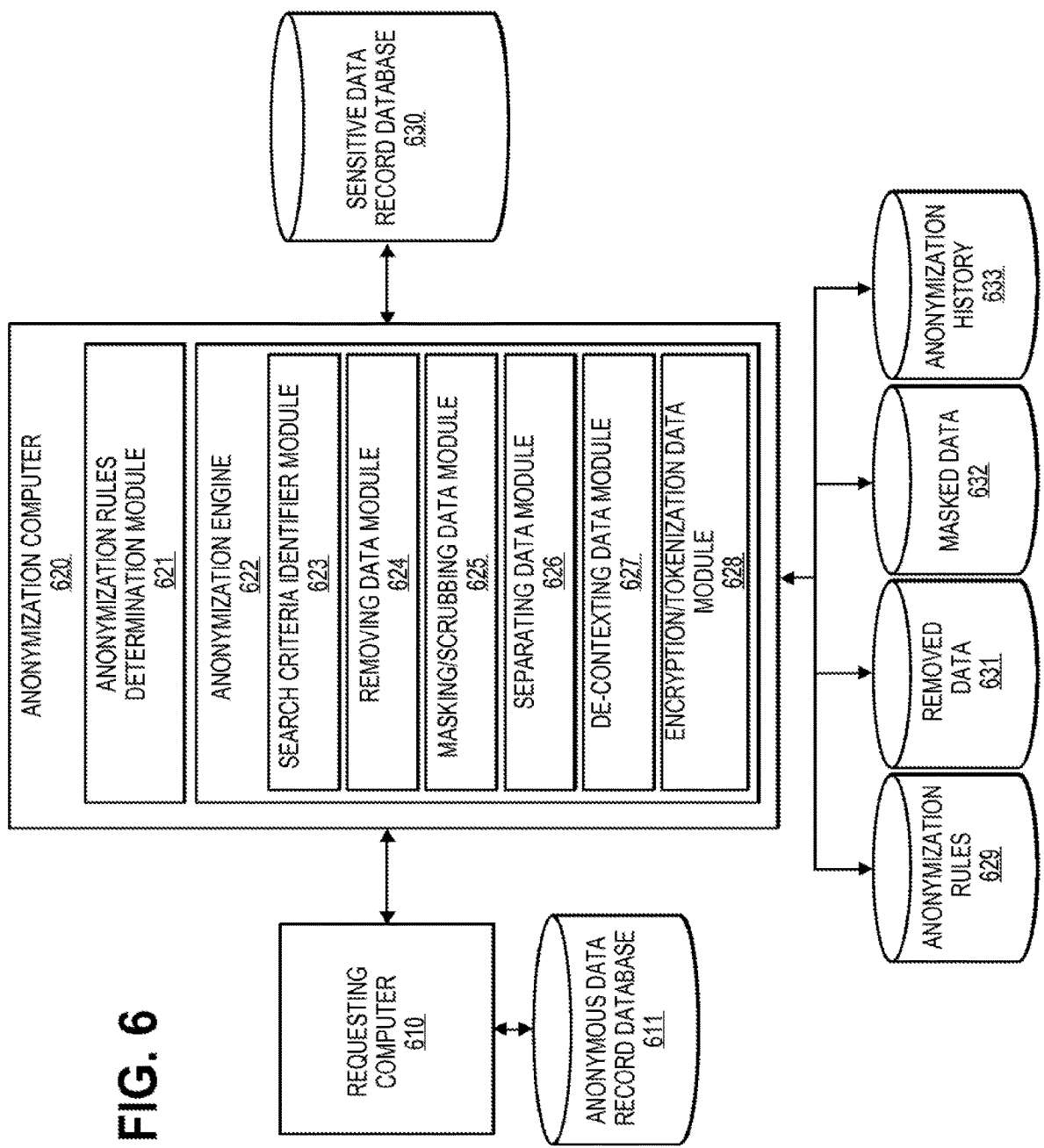
FIG. 6 shows a block diagram illustrating an exemplary database anonymization system, according to embodiments of the present invention.

As explained above, embodiments of the present invention may include a second embodiment directed at providing anonymization of sensitive data records as a service. FIG. 6 shows a block diagram illustrating an exemplary embodiment of a system for anonymizing sensitive data records, according to embodiments of the present invention.

The system 600 comprises a requesting computer 610, an anonymization computer 620, a sensitive data record database 630, and a plurality of databases for storing the sensitive data records after various stages of anonymization processing 621-627. The anonymization computer 620 comprises an anonymization rules determination module 621 and an anonymization engine 134 622. The anonymization computer 620 may also be coupled to an anonymization rules database 629. The anonymization engine 134 may include a search criteria identifier module 623, a removing data module 624, a masking/scrubbing data module 625, a separating data module 626, a de-contexting data module 627, and an anonymizing/tokenization data module 628.

The anonymization computer 620 may operate much like the privacy computer 130 described in reference to FIGS. 1-5 above. Accordingly, the anonymization rules determination module 621 may operate like the privacy rules determination module 133 described in reference to FIG. 2 above. Further, the anonymization engine 622 may operate and be configured much as the anonymization engine 123 described above in reference to FIG. 2.

In the interest of brevity, similarities may not be discussed in detail and instead, the differences between the anonymization engine 123 of FIGS. 1 and 2 and FIG. 6 may be provided in more detail below. The anonymization engine 622 of FIG. 6 comprises the same functionality and the same anonymization process modules as FIG. 2, however, the anonymization engine 622 of FIG. 6 may comprise additional functionality that may be not be implemented in the privacy firewall of FIG. 2. However, the additional functionality in the anonymization system may also be implemented in the privacy firewall system 100 of FIGS. 1-2, if desired.

The requesting system 110 may be any entity that is requesting a sensitive data record from a sensitive data record database 130. For example, a requesting system could be a customer service representative, a technician, a third party customer requesting metrics related to certain types of service, or any other interested party that would like access to data originating from a sensitive data record but is not authorized to view personal identifying information or personal account information for consumers. The requesting system may be coupled to an anonymized data record database that may be capable of storing and analyzing anonymized data. Accordingly, the requesting system may ask for a single record each time a request is generated and sent to the anonymization computer 620, or the requesting computer may be provided with a large amount of anonymized data and the requesting computer may thereafter search, analyze, and use the anonymous data record database at will.

The anonymous data record database may include any suitable memory, database, or other information storage device that is capable of communicating with a requesting computer. The anonymous data record database may be configured such that the anonymous data records may be searched, used, analyzed, or otherwise be free to be used by the requesting computer as desired.

The anonymization rules determination module may operate and be configured much as the privacy rules determination module 133 described in reference to FIG. 2. Accordingly, the anonymization computer 620 may determine anonymization rules associated with the requesting computer much as the privacy computer 130 determines privacy rules to apply to the recipient computer 140 in reference to FIGS. 1-5.

However, in some embodiments, the anonymization rules may be designed to anonymize data for a particular purpose of the requesting computer. Accordingly, in some embodiments, the anonymization computer 620 may determine the level of anonymization and a purpose for the anonymized data for a particular requesting computer 610 through inspecting an associated usage rights file (not shown) associated with the requesting computer 610 (e.g., marketing, aggregation, customer service, etc.), a database (not shown) of requesting systems' 110 usage rights, or through any other suitable means.

The anonymization rules database may include suitable memory, database, or other information storage device that is capable of communicating with a anonymization computer 620. Further, the anonymization rules database may be similar to the privacy rules database described in reference to FIGS. 1-5. Further, the anonymization rules may be very similar or the same as the privacy rules described in the privacy firewall embodiment above. However, instead of determining the recipient computer 140 based on the received message from the user computer 110, now the anonymization computer 620 may receive a request for a secure data record, may determine the identity and anonymization rules associated with the requesting computer, and may anonymize the secure data record according to the anonymization rules.

The removed data database may include any suitable memory, database, or other information storage device that is capable of communicating with a anonymization computer 620. The removed data database may include any sensitive information that is removed from the sensitive data record during the anonymization process.

The masked/scrubbed data database may include any suitable memory, database, or other information storage device that is capable of communicating with a anonymization computer 620. The masked/scrubbed data database may include any sensitive information that is masked or scrubbed from the sensitive data record during the anonymization process.

The anonymization history database may include any suitable memory, database, or other information storage device that is capable of communicating with an anonymization computer 620. The anonymization history database may include a mapping of anonymization processes that may be applied to a sensitive data record in order to anonymize the data. Accordingly, the anonymization history database may include instructions for reversing an anonymization process. The anonymization history database may be similar to the hidden record described above in reference to FIGS. 1-5 above. Accordingly, the anonymization computer 620 may reverse the anonymization processes using anonymization data stored during anonymization and the anonymziation history database.

Further, in some embodiments, the anonymized data record may include a hidden record identifying the anonymization history for the anonymized data record that details the anonymization steps that have been executed on the sensitive data record. Accordingly, the hidden record could be used to de-anonymize, separate, or otherwise reverse the anonymization processes of the anonymized data record.

The search criteria identifier module 124 may include a software module on the anonymization computer 620 that is configured to determine relevant search criteria for the requesting computer that may allow the requesting computer to search the anonymized data for relevant information without requiring all of the private or sensitive information in the sensitive data record. The anonymization engine 622 may use the search criteria identifier module to determine search criteria in the sensitive data record before the sensitive data is anonymized. For example, the search criteria identifier module may recognize the last four digits of the consumer's phone number, so the search criteria identifier module may flag or otherwise indicate that the last four digits of the phone number should not be anonymized to ensure it does not get encrypted during the anonymization processes 624-628. Accordingly, the data may still be searched by the requesting computer later. Further, most typically, the search criteria may be implemented through anonymization rules and thus, any conflict in rules may be identified before the search criteria is implemented. However, where a conflict exists, the search criteria identifier module may overcome the other anonymization processes.

Further, the search criteria identifier module may be implemented at any point through the system and any information flagged as a search sub-string should not be anonymized by the encryption/tokenization data module 628 or otherwise anonymized by the anonymization process modules 624-628. Accordingly, the search criteria identifier may also be capable of using sensitive information that has previously been removed or masked that is stored in the removed data database 631 and masked data database 632 and the anonymization history to recreate important search strings.

Finally, the encryption/tokenization data module 628 may include a software module on the anonymization computer 620 that is configured to access the sensitive data record after the anonymization processes associated with the anonymization rules have been completed. The encryption/tokenization data module 628 may be configured to encrypt, tokenize, or apply encryption controls to sensitive data in the sensitive data record.

The encryption/tokenization data module may anonymize information by encrypting or tokenizing sensitive data. If the data needs to be re-presented, an encryption or tokenization of the sensitive data may be performed such that the data may be decrypted using the token or known encryption key. Any suitable form of encryption may be applied. When the data is encrypted, the search sub-string may not encrypted so that the data may be found by searching the information record or the search sub-string may be encrypted in the record but an un-encrypted sub-string may be amended to the end of the encrypted data record.

However, if the sensitive data does not need to be re-presented, a one-way cryptographic technique (e.g. hashing, removing, etc.) may be applied such that the data may not be recovered by any subsequent user or system. The one way cryptographic technique could occur in any suitable manner such that the data is not recoverable by any subsequent user of the information (unless provided with the anonymized data). In some embodiments, the identified search strings may not be encrypted or in other embodiments, the search strings may be amended onto the end of the data record to allow for easy searching.

As explained above, in some embodiments, the anonymizing engine may wait until the end of the anonymization process and may apply the controls set by the earlier anonymization modules through the use of flags. Accordingly, the encryption engine may receive a sensitive data record where each anonymization rule has been applied through flagging of data but that remains sensitive because each final step of applying the controls has not been completed. Accordingly, the anonymization engine 622 may apply the controls to anonymize the data record. In such embodiments, the anonymizing engine may complete each step and save the data to the corresponding databases 631-633 so that the sensitive data record may be recreated at a later date.

Accordingly, once the sensitive data record is anonymized, the anonymizing computer may save the anonymous data record in an anonymous data record database (not shown) or may send the anonymous data record to the requesting system 110 to be saved in the anonymous data record database 611.

Embodiments of the present invention could be used in a wide variety of applications including in the monitization of database records without breaking any local, state, or national privacy regulations because the data would be anonymized. Furthermore, the value of the data would remain as the only data being removed is personal data (PAI and PII) that is not relevant to the underlying data and the data that is not anonymized could be highly customizable for any particular application. Embodiments of the present invention could be used in the aggregation of consumer data for any applications as well. Furthermore, the data could be shared with third parties and would meet standards, policies, etc. regarding privacy, consumer protection, etc. and any other regulations regarding consumer privacy and security.

V. Exemplary Methods of Anonymizing Databases

Figure 7:
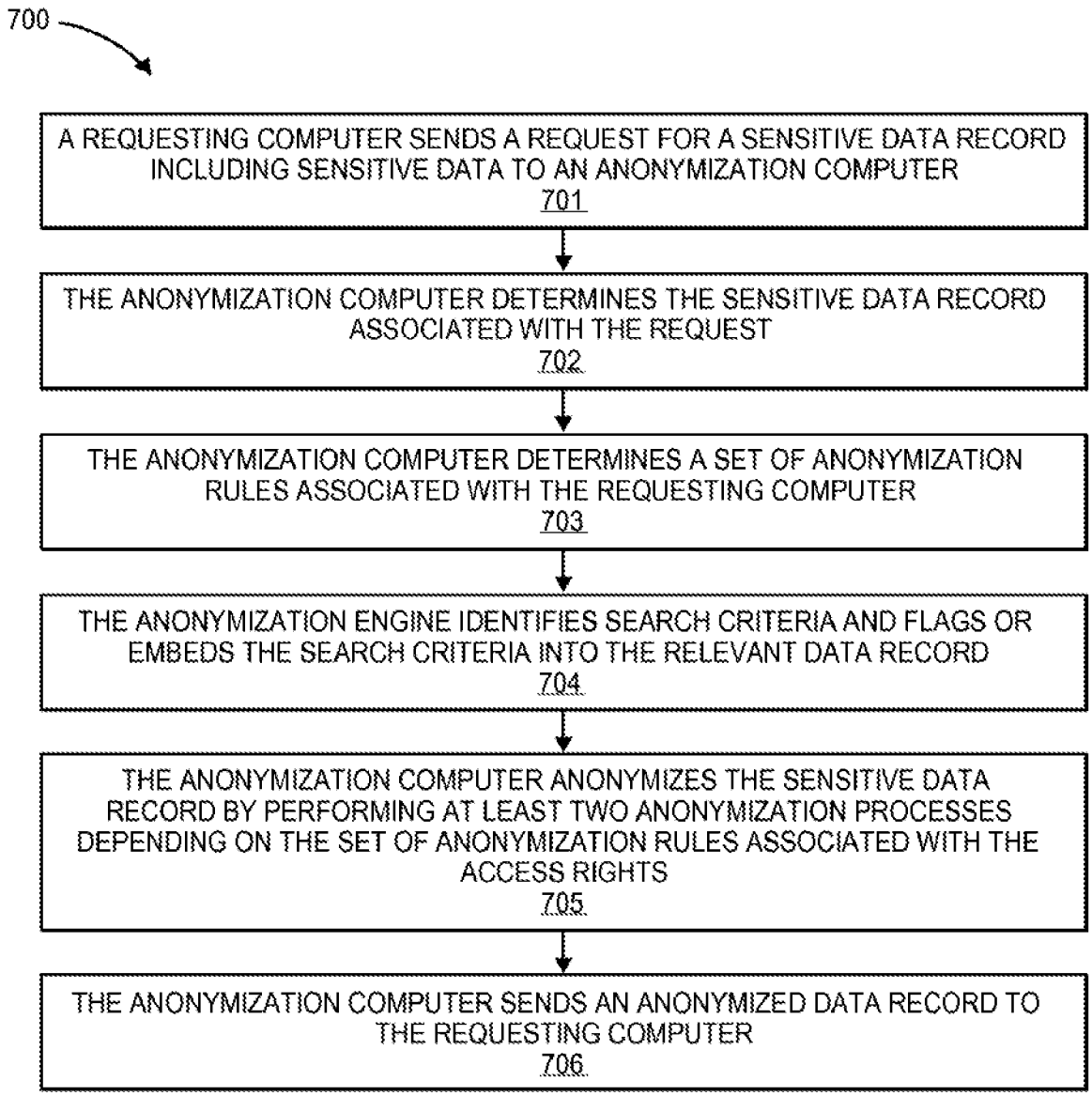
FIG. 7 shows a flowchart illustrating an exemplary method of providing an anonymized data record to a requesting entity, according to embodiments of the present invention.

FIG. 7 shows a flowchart illustrating an exemplary method of providing an anonymized data record to a requesting entity, according to embodiments of the present invention.

At step 701, a requesting computer sends a request for a sensitive data record including sensitive data to an anonymization computer 620.

At step 702, the anonymization computer 620 determines a sensitive data record associated with the request.

At step 703, the anonymization computer 620 determines a set of anonymization rules associated with the requesting computer. As explained above, there are numerous ways in which the system may be capable of implementing the anonymization rules described herein, including basing the anonymization rules on access rights associated with each recipient or requesting computer, using a sensitivity threshold that indicates the anonymization rules that may be applied where all any data over the sensitivity threshold is anonymized through various anonymization processes depending on the type sensitivity level of the private or sensitive data. Accordingly, depending on the implementation scheme, the anonymization rules may be determined by a variety of different means as one of ordinary skill would recognize.

For example, if a customer service representative is requesting an Amazon™ customer data record for a return of a product, the customer service representative may have no need for a large amount of data on the consumer's database record. The Amazon™ data record may comprise a first and last name, phone number, primary account number, expiration dates, cardholder name, bank identification number, shipping and billing addresses, email addresses, and challenge questions and answers. For instance, the consumer's social security number, personal account number, financial information, residential address, or any other sensitive personal information may be unnecessary for the task at hand (i.e., returning a product). As such, it is an unnecessary risk to show such information to a customer service agent who may steal the consumer's identity or otherwise use the consumer's information for illicit purposes. Accordingly, the customer service representative's request may be associated with usage rights, anonymization rules, or access rights that inform the anonymization computer 620 that all social security information, home addresses, and credit card numbers should be removed. However, the request or usage rights could also detail which information is necessary or important including purchase history and transaction details regarding products purchased, dates of purchase, etc. and this information could be included.

Accordingly, the determination of whether data is truly necessary for a particular requesting system could be determined by a system administrator, the security or legal agreements of the information provider whose information is being used, a state or federal government, or any other entity associated with the data. Accordingly, anonymization rules may be generated that are consistent with the purpose for the anonymized data.

At step 704, the anonymization engine 622 identifies the search criteria and flags or embeds the search criteria into the relevant data record. According to embodiments of the present invention, search strings may not be the entire piece of sensitive information but instead a sub-string of the sensitive information. For example, sub-strings could include the last four digits of a consumer's phone number, the last four digits of their social security number, the last four digits of the primary account number, zip code, first name, last name, etc. In some embodiments, the identified search strings may not be anonymized or in other embodiments, the search strings may be anonymized in the data record but then the search strings could be amended onto the end of the data record to allow for easy searching.

In some embodiments, the search sub-strings may also flag random data by a predetermined pattern such that the first four digits of each data entry may be saved because the likelihood that another consumer has the same first four digits of each data entry is miniscule. The rest of the data could later be encrypted or masked. In this manner, the anonymized data record could be compared and searched to identify a consumer internally but would not be helpful to a malicious third party in accomplishing a fraudulent transaction or identity theft. However, this embodiment may not provide as much valuable information for later analysis so may be used in only particular situations for record comparison and search.

At step 705, the anonymization engine 622 anonymizes the sensitive data records by performing at least two anonymization processes depending on the set of anonymization rules associated with the access rights. This process may occur like the privacy computer 130 implementing privacy rules as described above in relation to FIGS. 1-5.

In step 706, the anonymization computer 620 sends an anonymized data record to the requesting computer. After the anonymization of the data record into an anonymized data record, the anonymization computer 620 may send the anonymized data record to the requesting system 610 in response to the request for the sensitive data record. Accordingly, the sensitive data record has been transformed into an anonymized data record that protects the sensitive and private information originally contained in the sensitive data record, but may still allow a requesting computer the functionality of searching, aggregating, analyzing, accessing, and comparing the data in the record.

VI. Miscellaneous Embodiments

Embodiments of the present invention may include additional embodiments as well.

Another embodiment of the present invention may include a privacy firewall system. The privacy firewall system may comprise a user computer, a privacy computer, and a recipient computer. The user computer may be communicatively coupled to a privacy computer located in a secure area. The recipient computer may be communicatively coupled to the privacy computer. The privacy computer may comprise a processor and a computer-readable medium coupled to the processor. The computer-readable medium comprises code executable by the processor for performing a method. The method comprises receiving a message directed at a recipient computer located outside a secure area by a privacy computer located within a secure area. The message may include private information. The privacy computer may identify the private information using a plurality of privacy rules and anonymize the message according to the plurality of privacy rules. The privacy computer may forward the message including anonymized information to the recipient computer located outside the secure area.

Another embodiment of the present invention may include an anonymization system. The anonymization system may include a requesting computer and an anonymization computer coupled to a secure data record. The anonymization computer may comprise a processor and a computer-readable medium coupled to the processor. The computer-readable medium comprises code executable by the processor for performing a method. The method comprises receiving a request for sensitive data from a requesting computer by an anonymization computer. The anonymization computer may determine a sensitive data record comprising sensitive data associated with the request and determine anonymization rules associated with the requesting computer. The anonymization computer may anonymize the sensitive data record using the anonymization rules to generate an anonymized data record by performing at least two of: removing unnecessary sensitive data from the sensitive data record, masking the sensitive data to maintain format, separating the sensitive data into associated data groupings, and de-contexting the sensitive data. The anonymization computer may then send the anonymized data record to the requesting computer.

VII. Exemplary Computer System

The various participants and elements described herein with reference to FIG. 1 may operate one or more computer apparatuses to facilitate the functions described herein. Any of the elements in FIGS. 1, 2, and 4, including any servers or databases, may use any suitable number of subsystems to facilitate the functions described herein.

Figure 8:
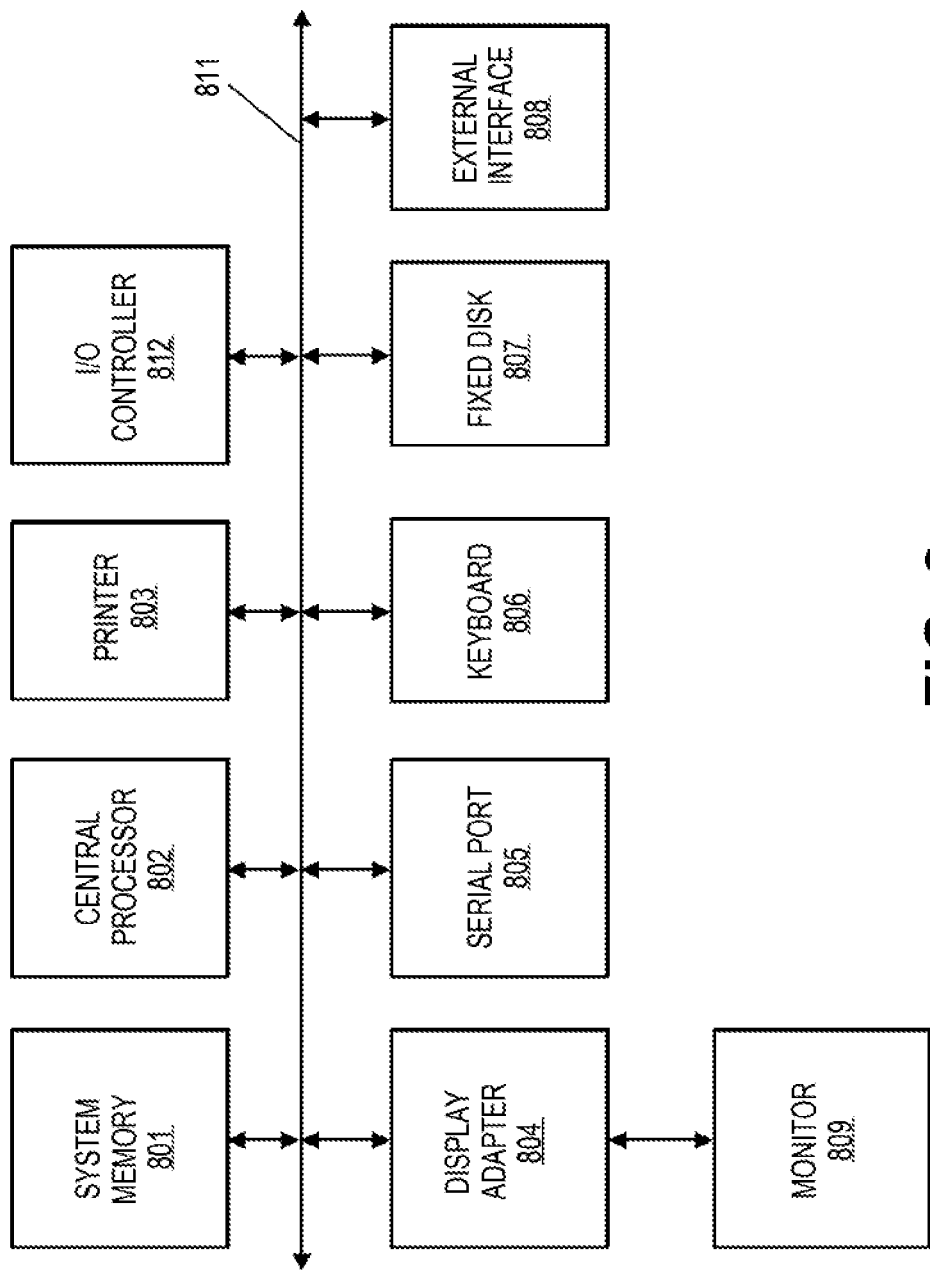
FIG. 8 shows a block diagram of an exemplary computer system.

Examples of such subsystems or components are shown in FIG. 8. The subsystems shown in FIG. 8 are interconnected via a system bus 811. Additional subsystems such as a printer 803, keyboard 806, fixed disk 807 (or other memory comprising computer readable media), monitor 809, which is coupled to display adapter 804, and others are shown. Peripherals and input/output (I/O) devices, which couple to I/O controller 812 (which can be a processor or other suitable controller), can be connected to the computer system by any number of means known in the art, such as serial port 805. For example, serial port 805 or external interface 808 can be used to connect the computer apparatus to a wide area network such as the Internet, a mouse input device, or a scanner. The interconnection via system bus allows the central processor 802 to communicate with each subsystem and to control the execution of instructions from system memory 801 or the fixed disk 807, as well as the exchange of information between subsystems. The system memory 801 and/or the fixed disk 807 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a recipient computer located outside a secure area, an anonymized message from a privacy computer located within the secure area, wherein the privacy computer generated the anonymized message by anonymizing a message including sensitive data based on a context of the message, and wherein the message was received by the privacy computer from a user computer, wherein anonymizing the message includes at least two different data alteration processes;
obtaining, by the recipient computer, one or more privacy rules applicable to the anonymized message; and
recreating, by the recipient computer, at least a portion of the sensitive data by applying the one or more privacy rules to the anonymized message,
wherein the anonymized message includes an embedded hidden record, and wherein the embedded hidden record includes instructions for recreating at least the portion of the sensitive data using the one or more privacy rules,
wherein the at least two different data alteration processes include two or more of the following:
removing unnecessary sensitive data;
masking the sensitive data to maintain format;
separate the sensitive data into associated data groupings; and
de-contexting the sensitive data.

2. The method of claim 1, wherein the context of the message includes at least one of an identity of the user computer, an identity of the recipient computer, an access right of the recipient computer, or the one or more privacy rules associated with the recipient computer.

3. The method of claim 1, wherein at least the portion of the sensitive data is recreated by reversing anonymization of at least the portion of the sensitive data using the one or more privacy rules.

4. The method of claim 1, wherein the anonymized message includes permanently altered data.

5. The method of claim 4, wherein the permanently altered data is unusable by the recipient computer.

6. The method of claim 4, wherein the privacy computer generates the permanently altered data by applying at least one of scrambling or polymorphism.

7. A recipient computer located outside a secure area, the recipient computer comprising one or more processors and a non-transitory machine-readable storage medium, including instructions that, when executed by the one or more processors, cause the one or more processors to:
receive an anonymized message from a privacy computer located within the secure area, wherein the privacy computer generated the anonymized message by anonymizing a message including sensitive data based on a context of the message, and wherein the message was received by the privacy computer from a user computer located within the secure area, wherein anonymizing the message includes at least two different data alteration processes;

obtain one or more privacy rules applicable to the anonymized message; and recreate at least a portion of the sensitive data by applying the one or more privacy rules to the anonymized message, wherein the anonymized message includes an embedded hidden record, and wherein the embedded hidden record includes instructions for recreating at least the portion of the sensitive data using the one or more privacy rules, wherein the at least two different data alteration processes include two or more of the following:

removing unnecessary sensitive data;

masking the sensitive data to maintain format;

separate the sensitive data into associated data groupings; and de-contexting the sensitive data.

8. The recipient computer of claim 7, wherein the context of the message includes at least one of an identity of the user computer, an identity of the recipient computer, an access right of the recipient computer, or the one or more privacy rules associated with the recipient computer.

9. The recipient computer of claim 7, wherein at least the portion of the sensitive data is recreated by reversing anonymization of at least the portion of the sensitive data using the one or more privacy rules.

10. A method comprising:

receiving, by a privacy computer located within a secure area, a message directed at a recipient computer located outside the secure area, wherein the message includes sensitive data;

identifying, by the privacy computer, the sensitive data using a plurality of privacy rules;

anonymizing, by the privacy computer, the sensitive data according to the plurality of privacy rules to generate anonymized data, wherein anonymizing the sensitive data according to the plurality of privacy rules includes using at least two data alteration processes;

generating, by the privacy computer, a hidden record including the anonymized data; and forwarding the hidden record and the message including the anonymized data to the recipient computer located outside the secure area, wherein the hidden record includes instructions for recreating at least a portion of the sensitive data using the plurality of privacy rules, wherein the at least two different data alteration processes include two or more of the following:

removing unnecessary sensitive data;

masking the sensitive data to maintain format;

separate the sensitive data into associated data groupings; and de-contexting the sensitive data.

11. The method of claim 10, wherein the plurality of privacy rules include limitations on the type of information that is allowed to be sent outside the secure area.

12. The method of claim 10, wherein identifying the sensitive data using the plurality of privacy rules further comprises:

determining a set of the plurality of privacy rules associated with the recipient computer; and comparing the sensitive data to the set of the plurality of privacy rules.

* * * * *